T. I. POTTER.
TURNSTILE MECHANISM.
APPLICATION FILED APR. 2, 1915.

1,275,740.

Patented Aug. 13, 1918.
13 SHEETS—SHEET 1.

Witnesses
M. G. Crandell
F. E. Ruth

Inventor
Thomas Irving Potter
By Church & Church
his Attorneys

T. I. POTTER.
TURNSTILE MECHANISM.
APPLICATION FILED APR. 2, 1915.
1,275,740.
Patented Aug. 13, 1918.
13 SHEETS—SHEET 2.
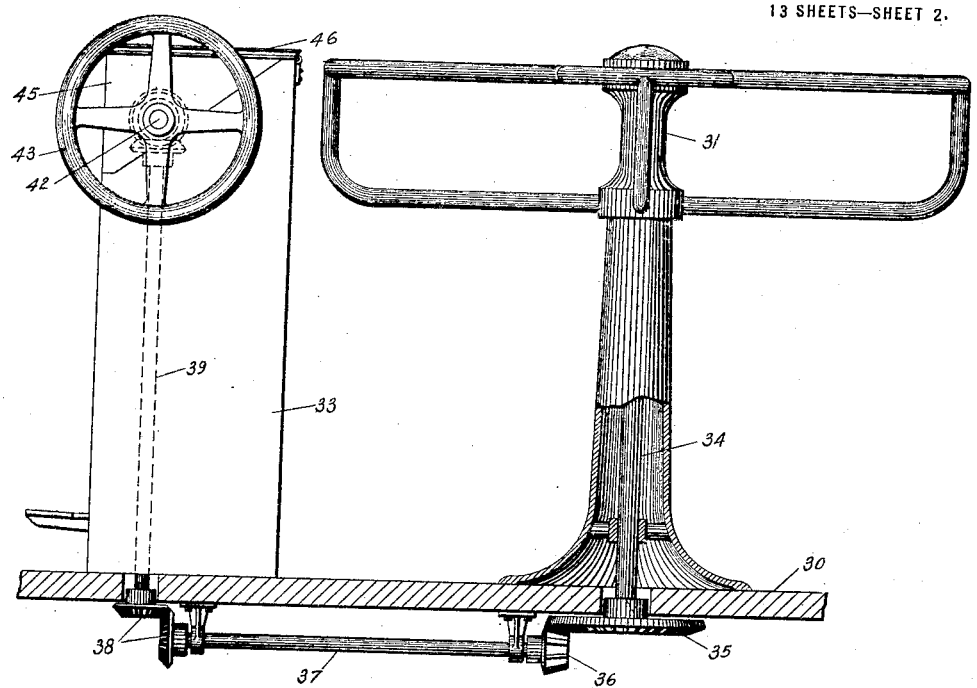
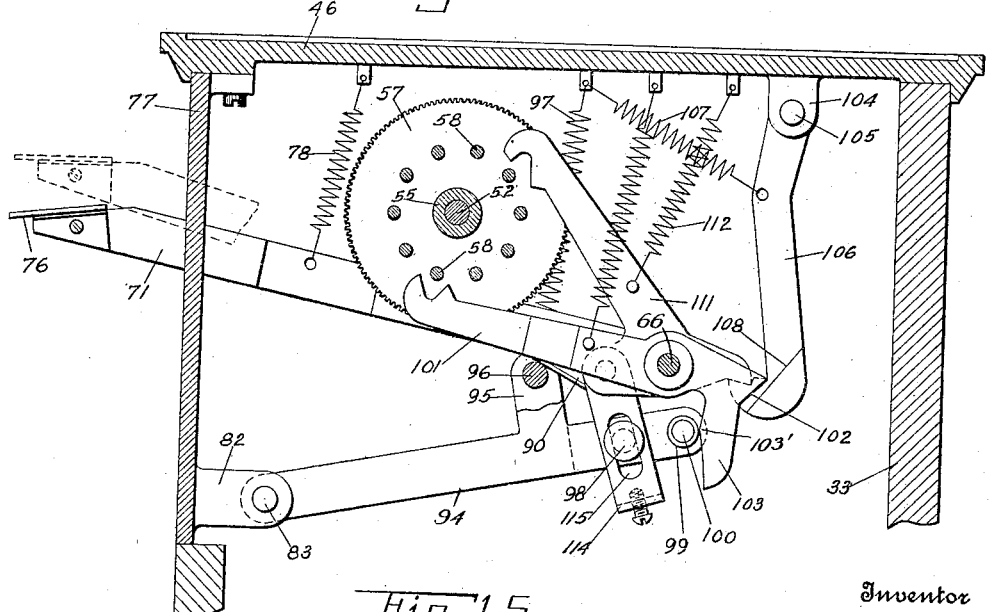

T. I. POTTER.
TURNSTILE MECHANISM.
APPLICATION FILED APR. 2, 1915.

1,275,740.

Patented Aug. 13, 1918.
13 SHEETS—SHEET 3.

Witnesses
M. G. Crandell
F. E. Ruth

Inventor
Thomas Irving Potter
By Church & Church
his Attorneys

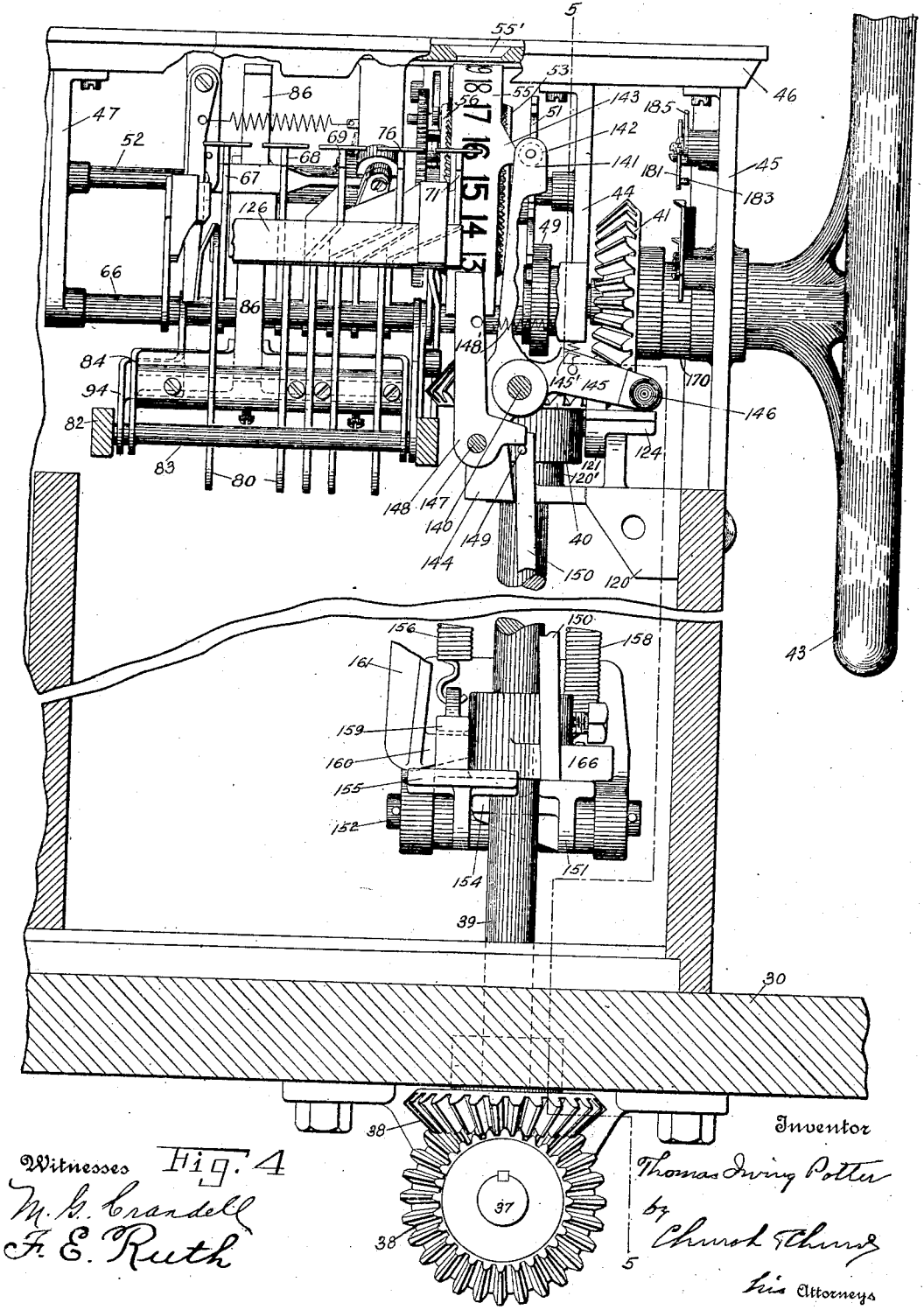

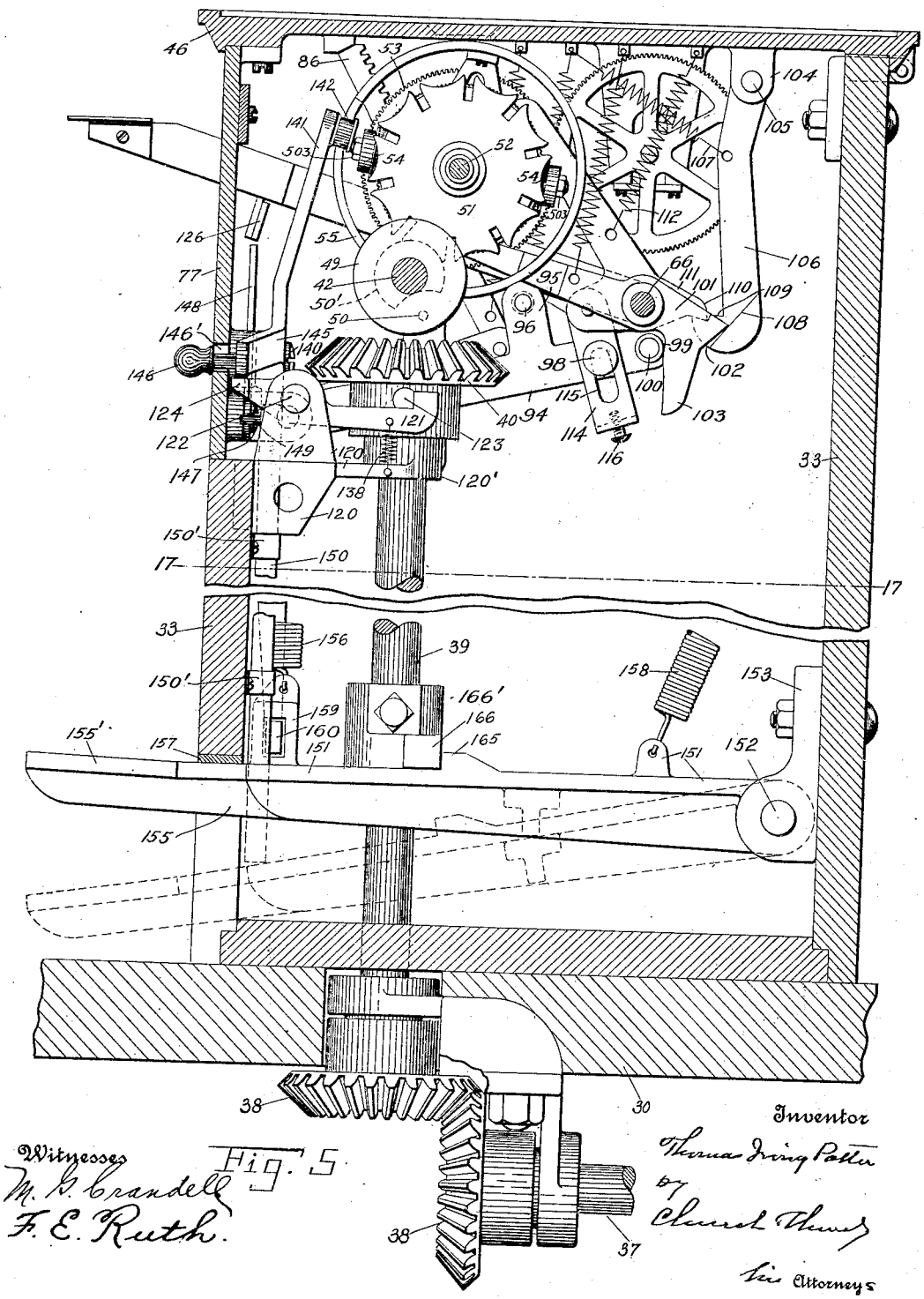

T. I. POTTER.
TURNSTILE MECHANISM.
APPLICATION FILED APR. 2, 1915.
1,275,740.
Patented Aug. 13, 1918.
13 SHEETS—SHEET 6.
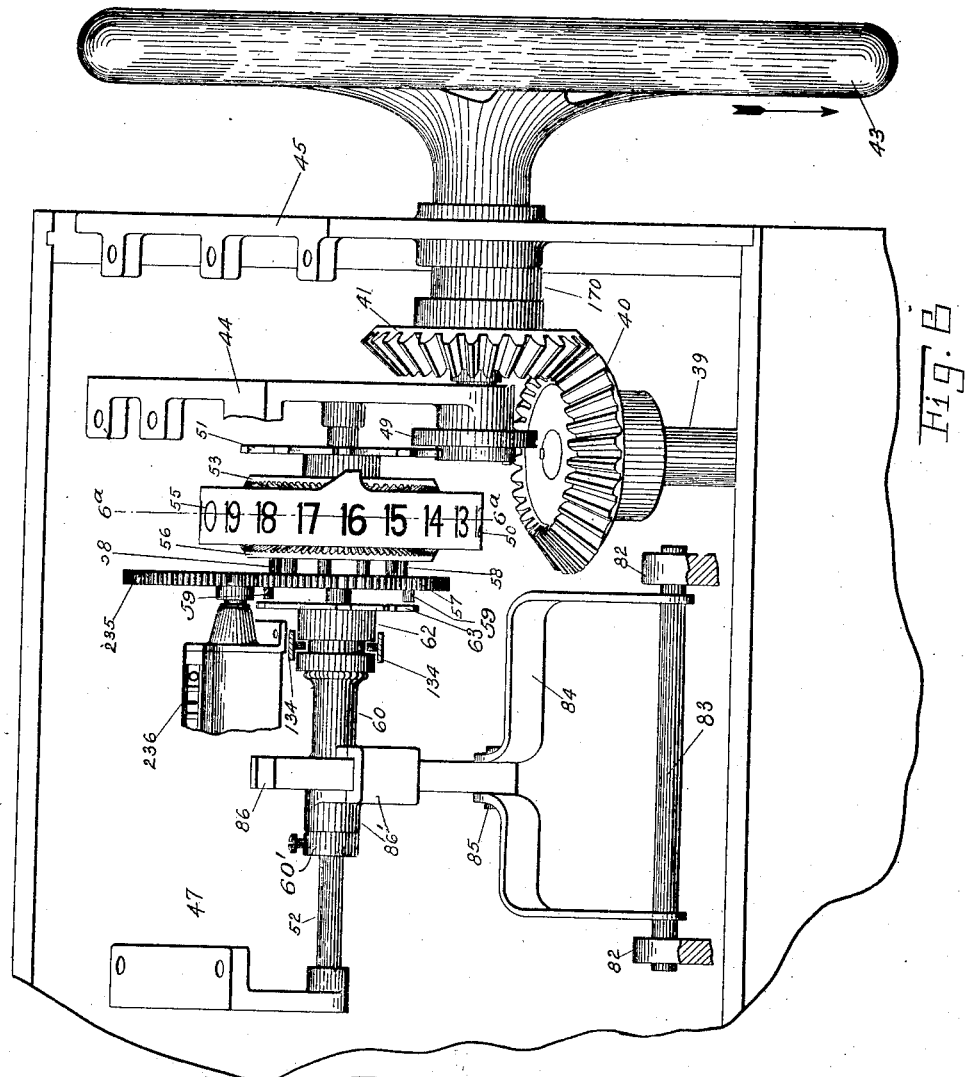
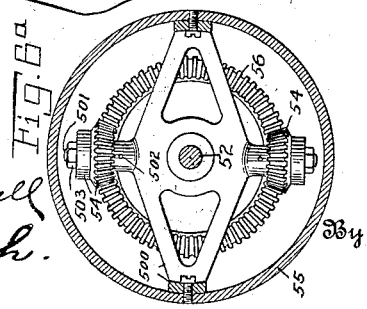

T. I. POTTER.
TURNSTILE MECHANISM.
APPLICATION FILED APR. 2, 1915.
1,275,740.
Patented Aug. 13, 1918.
13 SHEETS—SHEET 7.
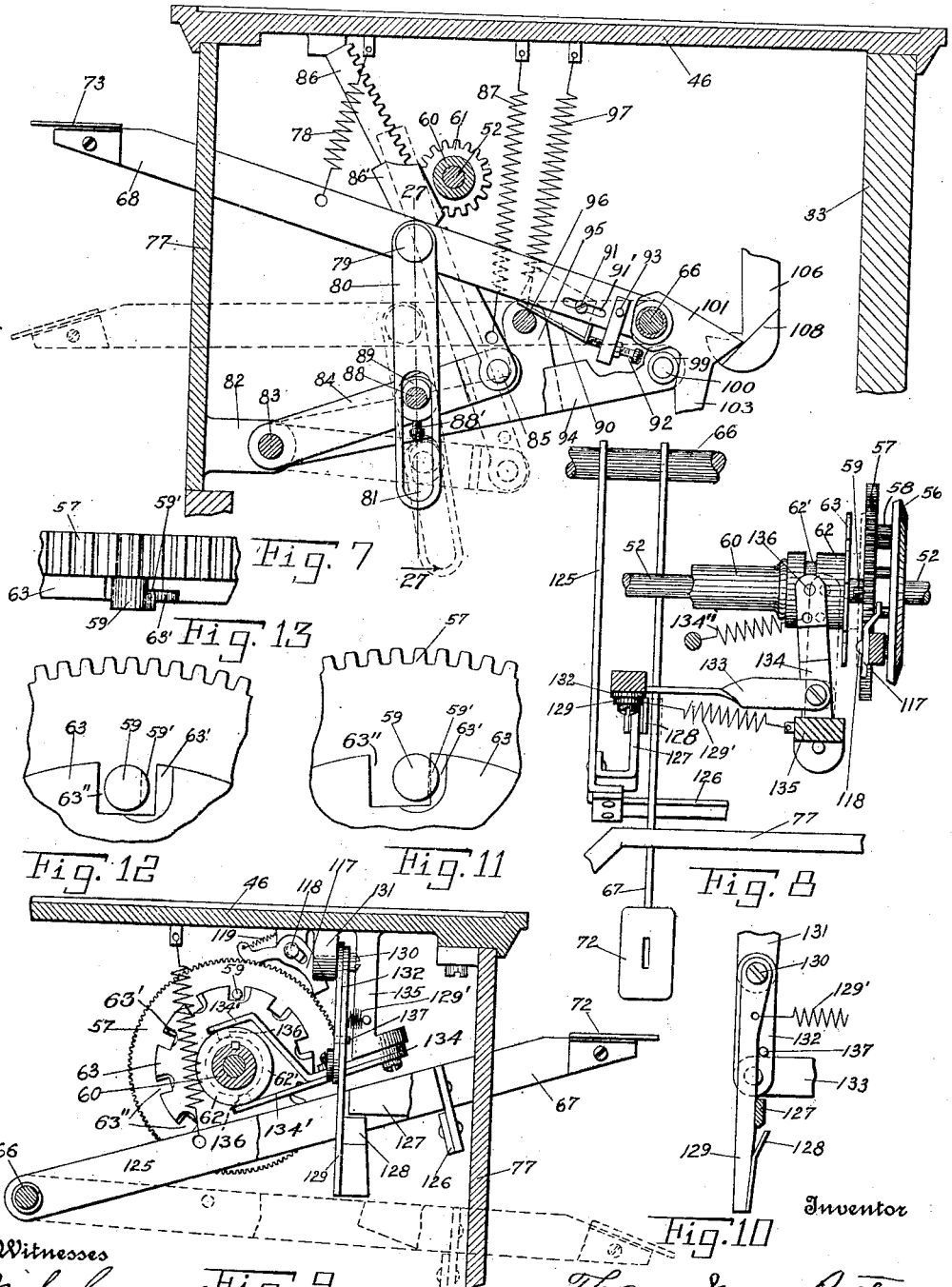
Witnesses
M. B. Crandell
F. E. Ruth.
Inventor
Thomas Irving Potter
By
Church & Church
His Attorneys

T. I. POTTER.
TURNSTILE MECHANISM.
APPLICATION FILED APR. 2, 1915.

1,275,740.

Patented Aug. 13, 1918.
13 SHEETS—SHEET 8.

T. I. POTTER.
TURNSTILE MECHANISM.
APPLICATION FILED APR. 2, 1915.
1,275,740.
Patented Aug. 13, 1918.
13 SHEETS—SHEET 10.
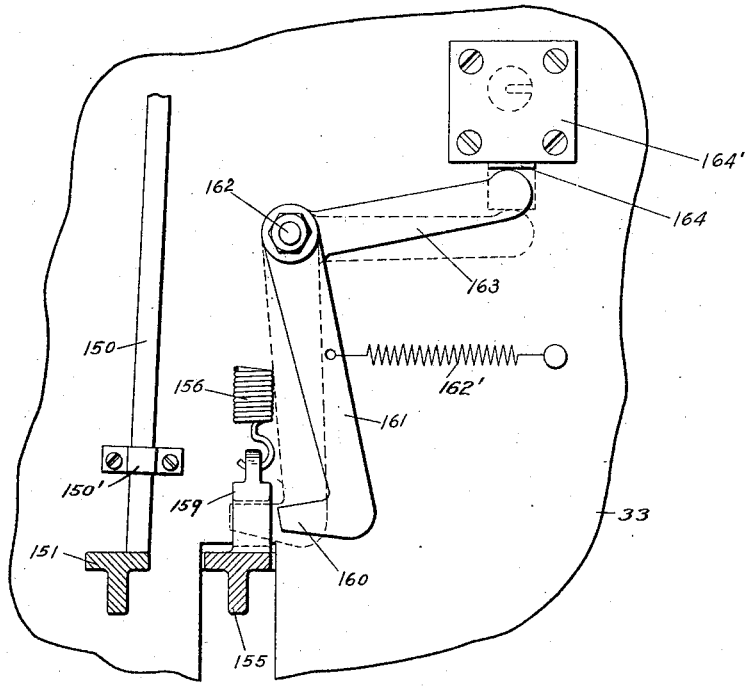
Fig. 18
Fig. 27
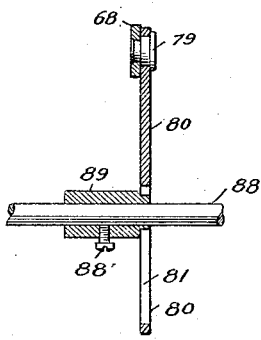
Witnesses
M. B. Crandell
F. E. Ruth.
Inventor
Thomas Irving Potter
By Church & Church
his Attorneys

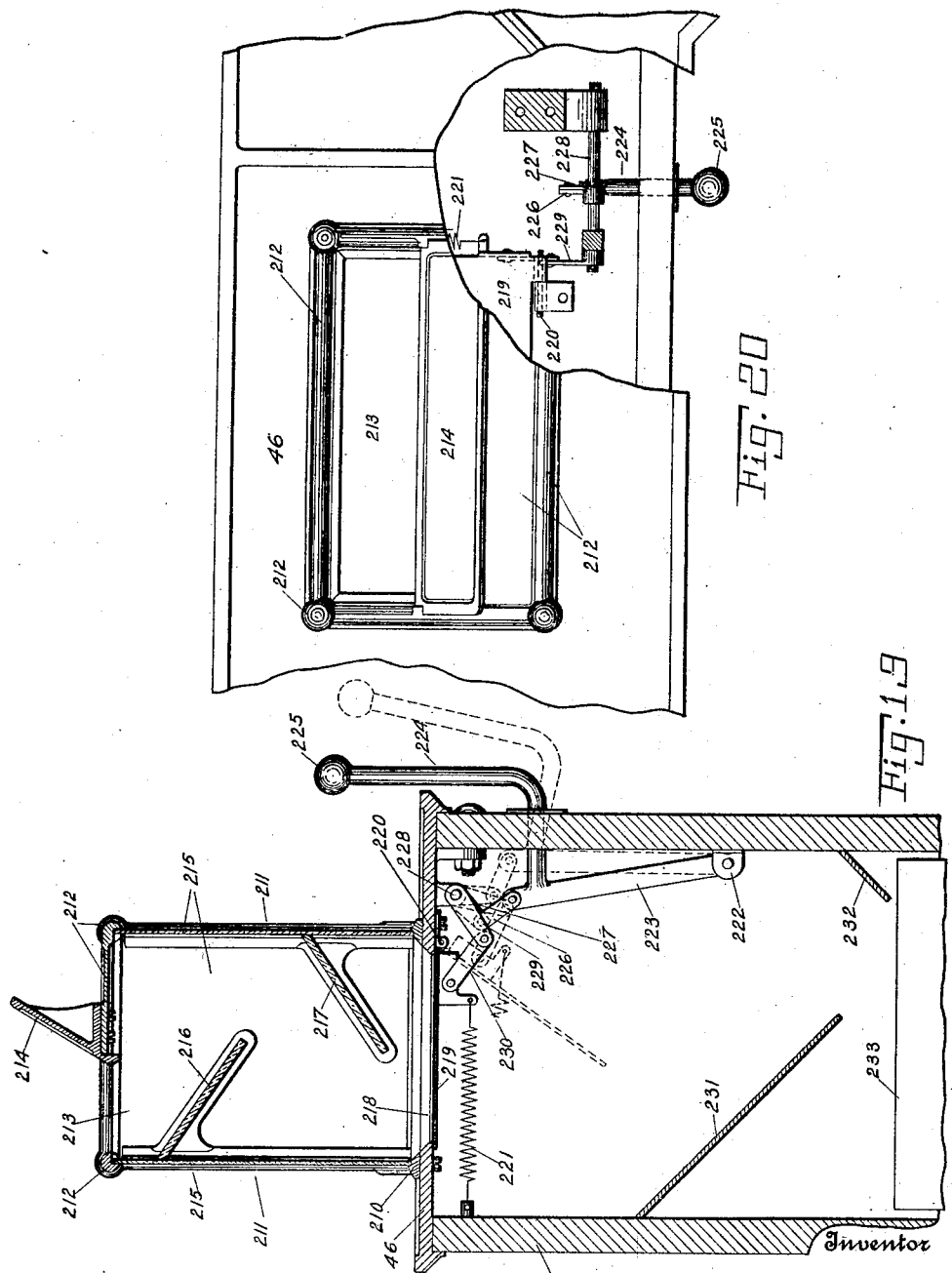

T. I. POTTER.
TURNSTILE MECHANISM.
APPLICATION FILED APR. 2, 1915.

1,275,740.

Patented Aug. 13, 1918.
13 SHEETS—SHEET 12.

T. I. POTTER.
TURNSTILE MECHANISM.
APPLICATION FILED APR. 2, 1915.

1,275,740.

Patented Aug. 13, 1918.
13 SHEETS—SHEET 13.

Witnesses
M. D. Crandell
F. E. Ruth.

Inventor
Thomas Irving Potter

By Church & Church
his Attorneys

UNITED STATES PATENT OFFICE.

THOMAS IRVING POTTER, OF PORTLAND, OREGON, ASSIGNOR TO COIN MACHINE MANUFACTURING COMPANY, OF PORTLAND, OREGON, A CORPORATION OF OREGON.

TURNSTILE MECHANISM.

1,275,740.  Specification of Letters Patent.  Patented Aug. 13, 1918.

Application filed April 2, 1915. Serial No. 18,785.

*To all whom it may concern:*

Be it known that I, THOMAS IRVING POTTER, a citizen of the United States, residing at Portland, in the county of Multnomah and State of Oregon, have invented certain new and useful Improvements in Turnstile Mechanism; and I do hereby declare the following to be a full, clear, and exact description of the same, reference being had to the accompanying drawings, forming part of this specification, and to the characters of reference marked thereon.

This invention relates to improvements in turnstile mechanism of the type adapted to regulate and control the passage and registration of persons entering past the turnstile.

The essential object in view is the efficient operation of such mechanism accompanied by assured accuracy and incapacity of the operator to alter registrations.

A more detail object is the provision of means for controlling turnstile mechanism in a manner first registering and indicating the number of admissions paid for, and, subsequently registering and indicating the number of persons admitted past the turnstile.

A still further object in view is the provision of means for actuating registering mechanism located remote from the turnstile.

With these and further objects in view, as will in part hereinafter become apparent and in part be stated, the invention comprises certain novel constructions, combinations and arrangements of parts as will be hereinafter fully described and claimed.

In the accompanying drawings,—

Fig. 4 is a front elevation, partly in section, with front casing removed and parts broken away.

Fig. 5 is a section taken on line 5—5 of Fig. 3, and Fig. 4.

Fig. 6 is a perspective view showing indicator and operating parts connected therewith.

Fig. 6ª is a vertical section taken on line 6ª—6ª of Fig. 6.

Figure 3:
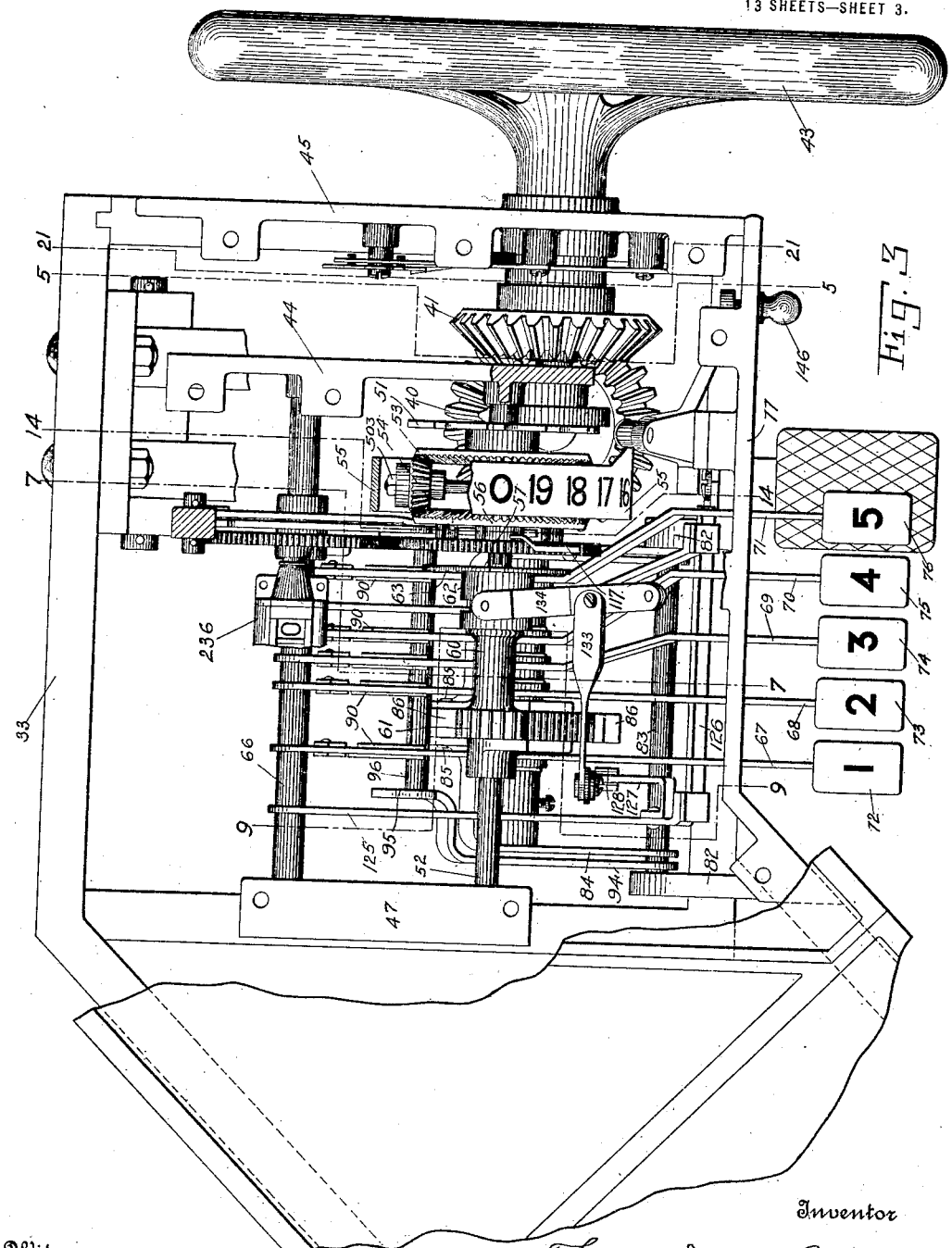
Fig. 3 is a top plan view on an enlarged scale of control and registering mechanism with cover removed and parts broken away.

Fig. 7 is a side sectional elevation of a part of the control mechanism on the line 7—7 of Fig. 3.

Fig. 8 is a fragmentary top plan view of the clutch and its actuating mechanism.

Fig. 9 is a section taken on line 9—9 of Fig. 3.

Fig. 10 is a fragmentary front elevation of the clutch operating cam and connections.

Figs. 11 and 12 are enlarged views of the clutch pin and part operating in conjunction therewith.

Fig. 13 is a fragmentary top plan view of Fig. 12.

Figure 14:
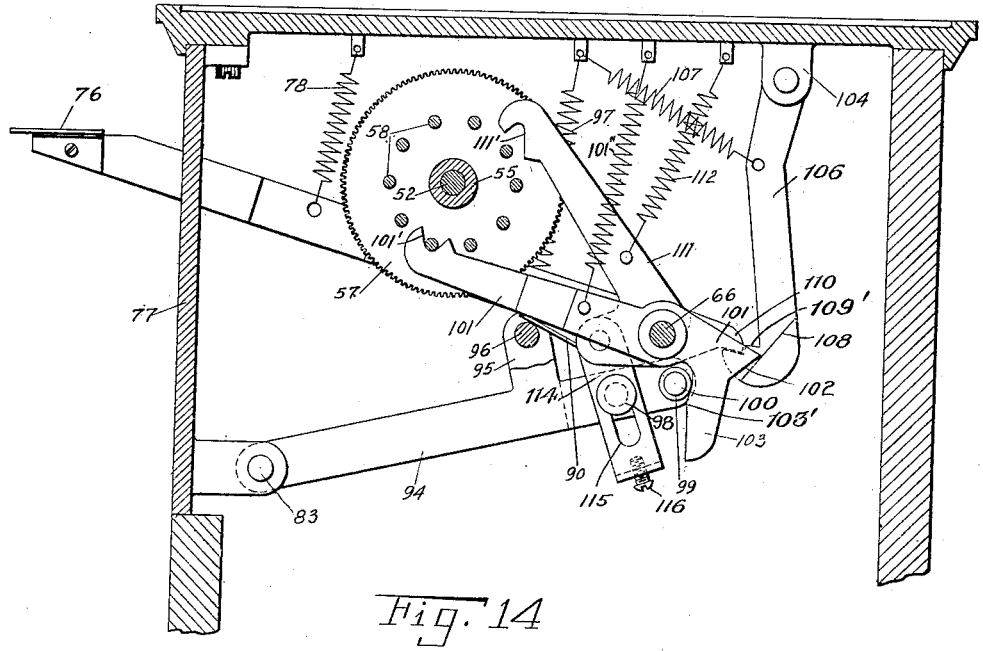

Fig. 14 is a sectional elevation on line 14—14 of Fig. 3.

Fig. 15 is a sectional elevation on line 14—14 of Fig. 3, showing mechanism in intermediate position.

Figure 16:
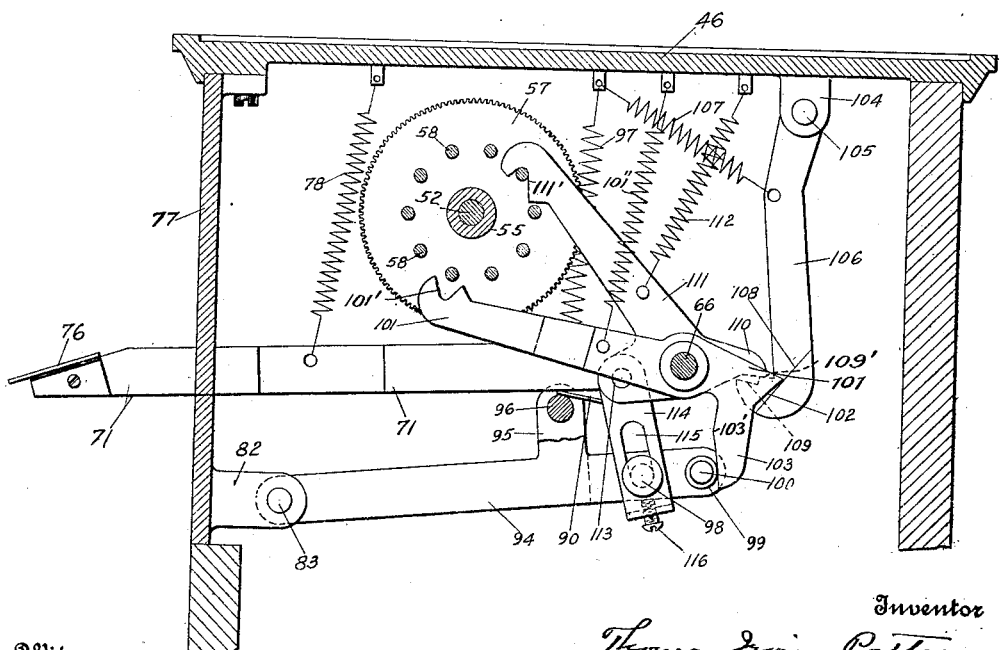

Fig. 16 is a sectional elevation on line 14—14 of Fig. 3, showing mechanism in its other extreme position.

Figure 17:
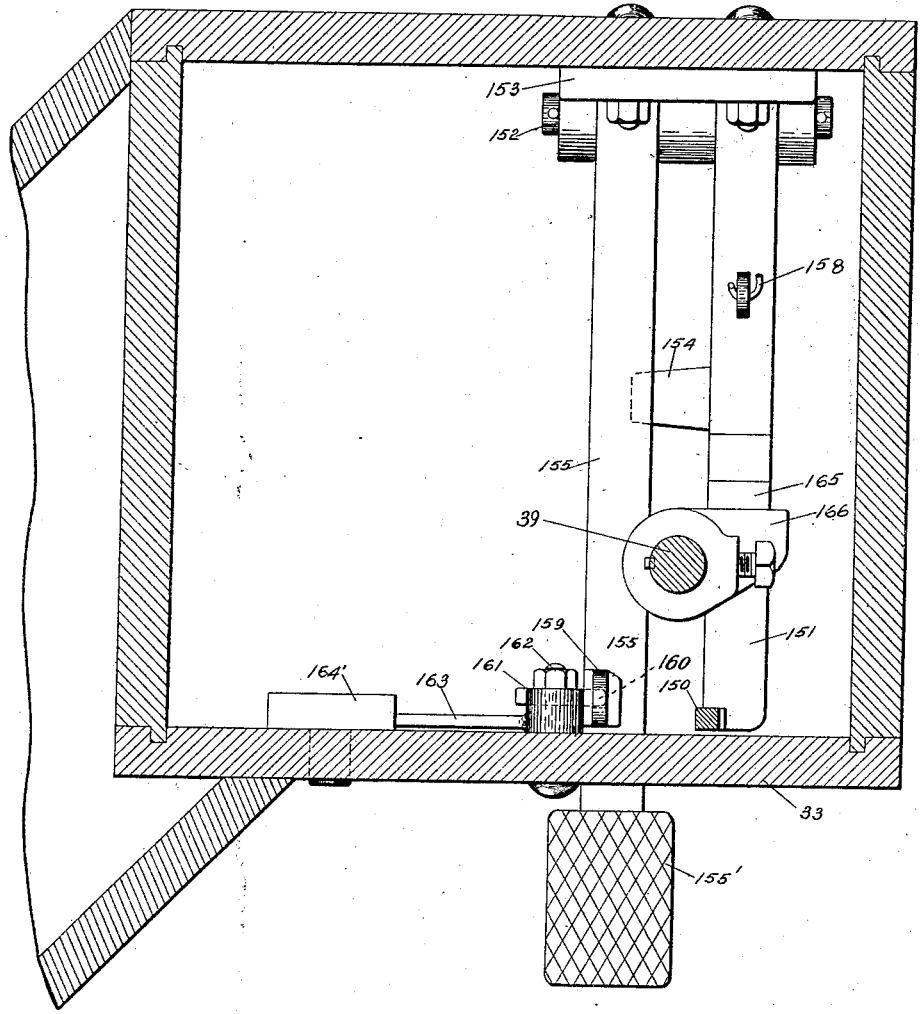

Fig. 17 is a section taken on line 17—17 of Fig. 5.

Fig. 18 is a rear elevation of foot pedal locking mechanism on the front wall of cabinet.

Figure 1:
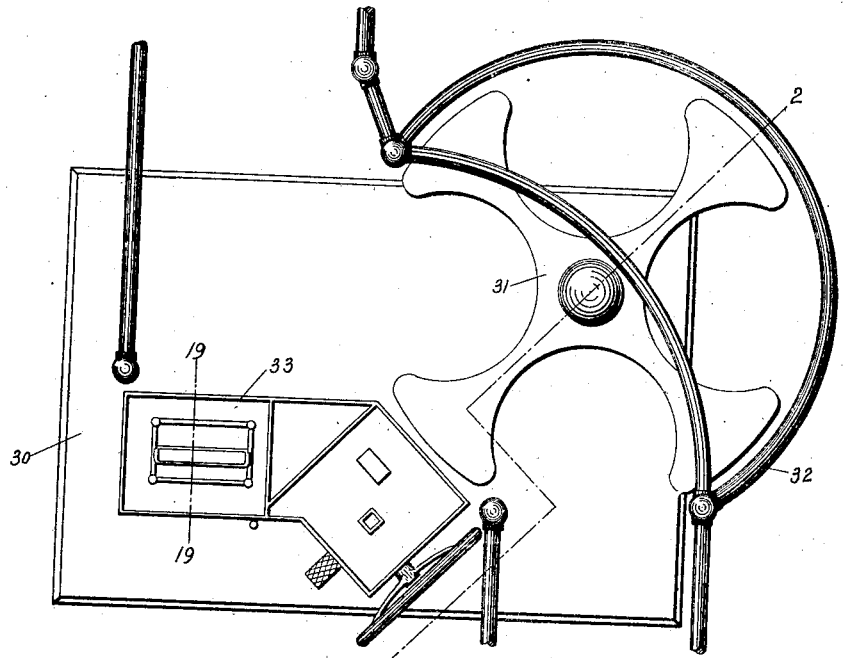
Figure 1 is a top plan view showing general arrangement of turnstile, control mechanism and railings.

Fig. 19 is a side elevation in section on line 19—19 of Fig. 1.

Fig. 20 is a top plan view of money receiving cage and operating parts with parts of cover broken away.

Figure 21:
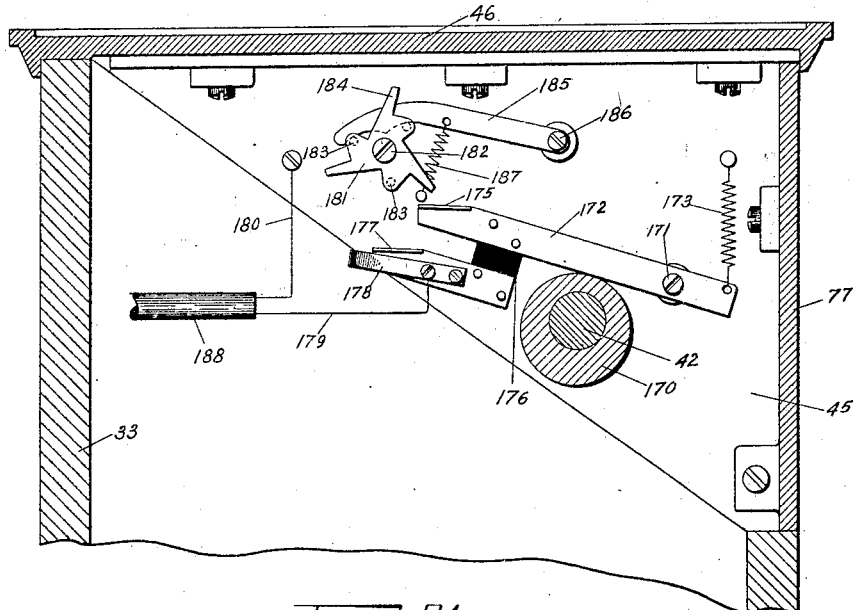

Fig. 21 is a section taken on line 21—21 of Fig. 3 showing in elevation the electric contact mechanism for operating electric counters.

Figure 22:
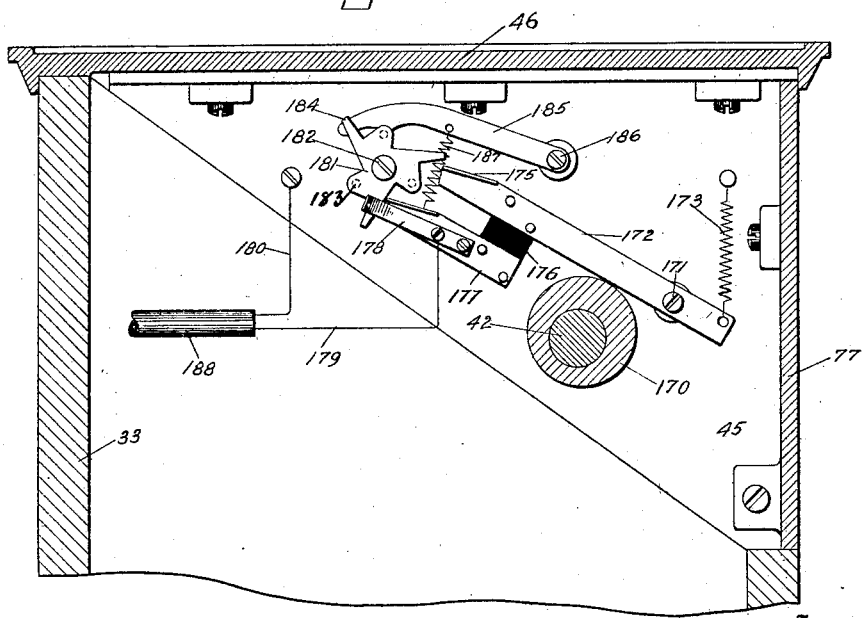

Fig. 22 is a view similar to Fig. 21 with the operating parts in reversed position.

Figure 23:
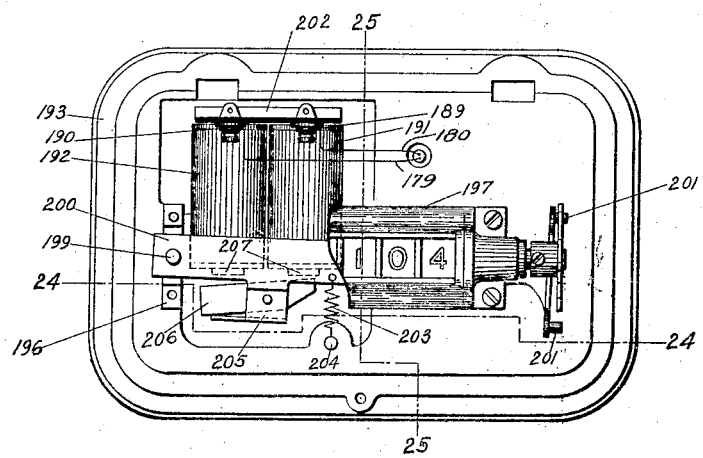

Fig. 23 is a top plan view of electric counter with cover removed.

Figure 24:
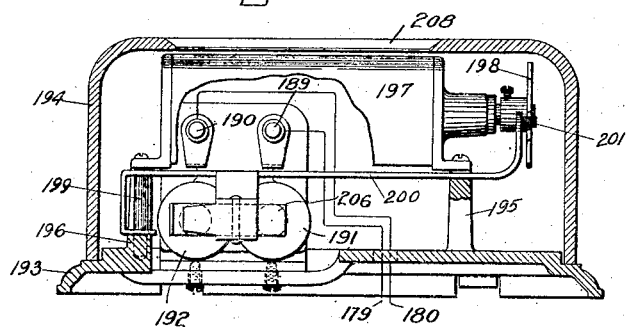

Fig. 24 is a section on line 24—24 of Fig. 23.

Figure 25:
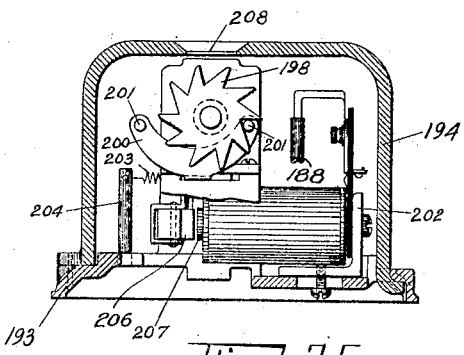

Fig. 25 is a section on line 25—25 of Fig. 23.

Fig. 26 is a side sectional elevation of the counter and some of its operating parts.

Fig. 27 is a section on the line 27—27 of Fig. 7.

Referring to the drawings by numerals, 30 indicates a base on which is mounted a turnstile 31 provided with appropriately located guard railings 32. A cabinet or casing 33 is also mounted on base 30 and spaced from the turnstile, the casing containing controlling, indicating and registering mechanism, and also electrical contact mechanism, as hereinafter specified.

Figure 2B:
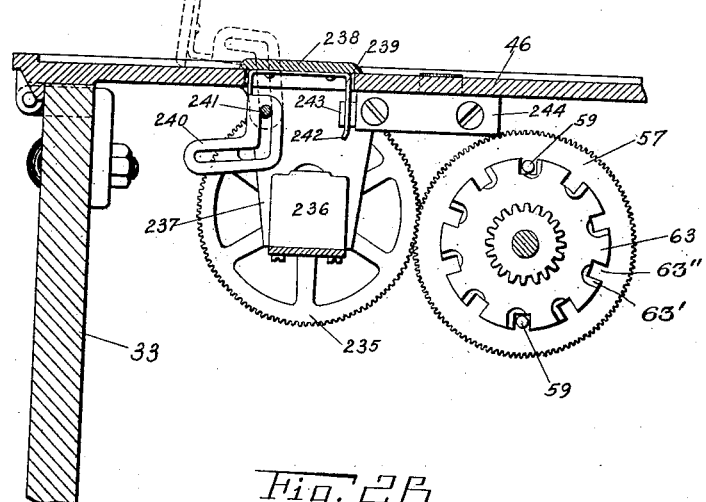
Fig. 2 is a side elevation partly in section on line 2—2 of Fig. 1 and showing parts connecting turnstile with the control mechanism.

As best seen in Fig. 2, a vertical shaft 34 is rigidly fixed to the head of turnstile 31 and provided at its lower end with a bevel gear 35 meshing with a similar gear 36 and proportioned in a ratio of four to one.

A shaft 37 journaled in brackets depending from base 30 carries the gear 36 at one end and a miter gear at the other end meshing with a similar gear 38 fixed to a vertical shaft 39 journaled within the casing 33 and extending upwardly therein. Fixed to the upper end of the shaft 39 is a miter gear 40 which meshes with a similar gear 41 fixed on stub shaft 42, the stub shaft being journaled in brackets 44 and 45 fixed to and extending downwardly from the under side of the cover plate 46 of casing 33. The outer end of the shaft 42 carries a hand wheel 43 for causing the rotation of the turnstile at all times to be under the control of the operator by virtue of possible manipulations of wheel 43. Fixed to the inner end of shaft 42 is a disk 49 having an axially extended pin 50 projecting from its inner face and adapted in operation to enter radial notches in disk 51 journaled on shaft 52, the disk 51 being provided with ten such notches and the peripheral portions of the disk between the notches being of incurved arcuate form adapted to be engaged by the segment 50' of disk 49, the said parts forming a Geneva stop for insuring the impartation of a step by step movement to disk 51, the disk being given one step of movement with each one quarter turn of the turnstile 31. Each step in the rotation of disk 51 is, of course, equivalent to one-tenth of a revolution. Shaft 52 is fixed in bracket 44 at one end and at the other end in a bracket 47, which bracket is fixed to the cover plate 46 and depends therefrom.

Disk 51 is journaled on the shaft 52 and is fixed to the hub of a bevel gear 53 which gear meshes at diametrically opposite points with bevel pinions 54, said pinions being journaled on shafts fixed to and extending radially inwardly from a ring or band 55. The peripheral surface of ring 55 bears legends adapted to indicate at any time the number of admission fees, if any, which have been paid for and unused, such legends consisting preferably of twenty numbers ranging from zero to nineteen consecutively and equally spaced about the ring. Facing gear 53 and at the opposite side of gears 54 is a bevel gear 56 which is journaled on the shaft 52 and meshes with the pinions 54. Fixed to the hub of gear 56 is a spur gear 57 spaced axially from gear 56. Arranged in a circle and equally spaced about, fixed to and connecting gears 56 and 57 are ten escapement pins 58 adapted to be engaged by locking arms hereinafter described for preventing spinning or any movement of gears 56 and 57 under momentum. The ratio of gears 53 and 56 to pinions 54 is the same and is such that, if gear 56 is held against rotation while gear 53 is rotated one-tenth of a revolution incident to one quarter of a revolution of turnstile 31, which amounts to one revolution of hand wheel 43 and one step of disk 51, the ring 55 with its dial face will be rotated in one direction (which relative to the numerical value of the dial legends is backward,) for one-twentieth of a revolution, or the distance equal to the space allotted to one number on the dial; and when gear 53 is held stationary and gear 56 rotated one-tenth of a revolution, ring 55 will be moved in the other direction (that is, advanced,) one twentieth of a revolution.

Extending axially from the face of gear 57 opposite that engaged by pins 58 are clutch pins 59, preferably two in number. A hub 60 is journaled on shaft 52 with one end adjacent to gear 57, the other end fixedly carrying a spur pinion 61. A clutch sleeve 62 is splined on hub 60 adjacent to gear 57, and carries a disk 63 formed with ten equally spaced radial notches 63'', each having one side cut away, as at 63', for leaving a thin edge adapted at times to enter an undercut groove 59' formed in each pin 59. (See Figs. 8 to 13, inclusive.)

Suitably secured in the bearing brackets 44 and 47, Fig. 3, is a shaft 66, Fig. 7, on which is pivoted five key arms 67, 68, 69, 70, 71, each of which is respectively supplied with a key tip 72, 73, 74, 75, and 76, numbered from 1 to 5 consecutively. Each arm passes through a suitable slot in a plate 77 forming a portion of the outside casing of the cabinet. Suitable springs 78 retain the key arms in an upward position and permit of their depression. Pivoted to each of the key arms by pins 79 and depending from the arms are links 80, each slotted longitudinally, as at 81, (Fig. 7) the lengths of slots 81 increasing progressively from the shortest for the link 80 of arm 71 to the longest for the link of arm 67. A frame 84 (Figs. 4 and 7) is pivoted on a shaft 83 carried by lugs 82 extending inwardly from plate 77. A pin 85 carried by the inner portion of frame 84 pivotally carries a rack bar 86 having teeth meshing with pinion 61, the rack being adapted to be reciprocated past the pinion for rotating the latter when frame 84 is swung. A guard shoe 86' extends from hub 60 and incloses the three smooth sides of the rack bar 86, preventing bar 86 from becoming disengaged from pinion 61. A stop collar 60' surrounds shaft 52 and is connected thereto by a set-screw preventing axial displacement of hub 60. Frame 84 carries a cross shaft 88 having an eccentric hub 89 for each link 80 and arranged for adjustment in the slot 81 thereof, each eccentric hub being adjustably secured to shaft 88 by a set screw 88'. A spring 87 is disposed to retain rack 86 and frame 84 in their raised position free for downward movement against the tension of the spring. An inclined plate or dog 90 is pivotally connected to each key arm 67 to 71, each dog 90 (Fig. 7) being connected by a screw or pin 91 extending through a longitudinal slot 91' in the respective key arm so as to be adjustable longitudinally of the arm, the inner end of each dog 90 being engaged by a set screw 92 carried by a bracket 93 fixed to and depending from the respective arm.

When the key 72, Fig. 3, is depressed, its arm 80 slides on the pin 88 Fig. 7 until the end of the slot 81 is reached, after which, through contact with eccentric bushing 89 the shaft 88, frame 84, and rack 86 are depressed and the pinion 61 and disk 63 are rotated one-tenth of a revolution. The disk 63 having been moved by mechanism to be described into engagement with the pins 59 will rotate the gears 57 and 56 one-tenth of a revolution. If the key 76 is depressed then the operation will result in rotation of the pinion 61 and gears 57 and 56 five-tenths or one-half of a revolution, resulting in the rotation of the dial 55 five-twentieths of a revolution or five numbers and in a reverse direction from that resulting from a normal movement of the hand wheel 43, as indicated by the arrow in Fig. 6.

A frame 94 is pivoted on shaft 83 (Figs. 7, 14 to 16) and substantially incloses frame 94 (Fig. 3) the inner portions of the side bars of frame 84 having upstanding arms 95 carrying a shaft 96 which is disposed transversely of and is adapted to be actuated by contact with dogs 90 during vertical swinging movement of the key arms. Frame 94 is maintained normally in an elevated position by spring 97. An extension or arm at the inner portion of one of the side bars of frame 94 carries a pin 98 and spaced therefrom a second pin 100, and on the latter pin is mounted an anti-friction sleeve or roller 99. A locking lever 101 is pivoted on shaft 66 with the free end portion of its longer arm formed with an upwardly opening, substantially V-shaped notch 101' adapted in operation, as will hereinafter appear, to engage pins 58. The portion of lever 101 at the other side of shaft 66 is formed with a cam surface 102 and a contact finger 103, the latter being adapted to engage roller 99. A spring 101" normally sustains the longer arm of lever 101 in a raised position. A lug 104 depends from the cover plate 46 and a depending link 106 is connected by pivot pin 105 with the lug 104 and is maintained under forward spring tension by spring 107. The lower portion of link 106 is formed with a cam surface 108 disposed to engage cam surface 102, the link 106 being also formed with a hook 109 adapted to engage a finger 110 carried by a lever 111 pivoted on shaft 66. The long arm of lever 111 corresponds substantially in form to the long arm of lever 101 and is provided at its free end with a notch 111' disposed to engage pins 58 in operation. A spring 112 engages lever 111 and is tensioned to elevate the long arm thereof. The short arm of lever 111 carries a pin 113 which is pivotally engaged by a depending link 114, said link being formed with a longitudinal slot 115 through which extends the pin 98 of frame 94. An adjusting screw 116 is carried by link 114 and is disposed to engage a portion of frame 94.

Normally notch 101' engages a pin 58, as seen in Fig. 14, but when a key 72—76 is depressed the particular dog 90 of the given lever arm carrying the depressed key engages shaft 96 and depressing the same causes the roller 99 to ride along finger 103 over a forward projection 103' which, pressing the finger 103 rearwardly swings the lever 101 on its pivot 66 to the position indicated in Fig. 15. The notch 101' being out of engagement with the given pin 58, the gear 57 is free to be rotated, which rotation is accomplished by the clutch mechanism consisting of disk 63 and its coöperating parts, the rotation of the gear 57 being completed as the key arm is moving downwardly, and before the pin 98 engages the lower end of slot 115. The arm 101 is maintained in its lowered position by virtue of the fact that the roller 99 rides along a portion of the finger 103 relatively advanced from the projection 103' on an arc having its center at 83. As the wall of link 114 at the lower end of a slot 115 engages pin 98 during the downward movement of the key lever, the link begins to move downwardly moving with it the short arm of lever 111 which swings the lever to the position indicated in Fig. 16 with the notch 111' engaging one of the pins 58 and locking the gear 57 against movement, which position of the lever is maintained until the key arm is raised to its normal, upper position. The maintenance of the locking action of lever 111 is accomplished by virtue of the fact that when the lever is swung downwardly, the free end of finger 110 is elevated out of engagement with the main portion of hook 109, the hook being formed with an elevated shoulder 109' at its rear portion. As soon as finger 110 is elevated, link 106 is swung forwardly and the shouldered portion 109' is thus advanced beneath finger 110 and prevents downward movement thereof and thus prevents the long arm of lever 111 from leaving its locking engagement with pin 58. In the meantime, the advancing of the lower end of link 106 has brought the cam surface 108 into engagement with cam surface 102, so that when the key arm is allowed to move upward sufficiently for allowing roller 99 to ride upwardly past projection 103' the resulting forward movement of finger 103 accompanying the upward movement of the long arm of lever 101 causes the surface 102 to act upon surface 108 and press the same rearwardly until the shoulder portion 109' passes rearwardly beyond the free end of finger 110 and allows the finger to drop down into engagement with the main portion of hook 109, the longer arm of lever 111 being thus allowed to swing upwardly under the action of spring 112 substantially simultaneously with the upward movement of lever 101, so that substantially as a pin 58 is released from notch 111' another pin 58 is engaged by notch 101', and the gear 57 is thus afforded no opportunity for actuation during the return movement of the key arm.

A spring pawl 117 Figs. 8 and 9 is formed with a longitudinal slot through which extends the pin 118 forming the pivot for the pawl, the pin being carried by a lug depending from cover plate 46 in position for having the free end of the pawl engage the teeth of gear 57, the opposite end of the pawl being engaged by a spring 119 which tends both to maintain the pawl in engagement with gear 57 and to prevent longitudinal travel of the pawl, the pawl being restored to its normal position by the spring when caused to have longitudinal travel accommodated by the slot of the pawl.

A frame 125 is pivoted to shaft 66 and extends outwardly to a point adjacent to plate 77 (Figs. 8 and 9) and there carries a cross bar 126 which extends beneath the key arms 67, 68, 69, 70 and 71 in position for being struck and depressed by any of said arms. A bracket 127 preferably U-shaped is fixed to frame 125, near the outer end thereof, one arm of the bracket 127 being disposed in position for engaging a cam surface 128 (Fig. 10) carried by a link 129 pivoted to the lug 131 depending from cover plate 46. A link 132 is pivoted on pin 130, which is also the pivot pin of 129, and the pin 137 projects laterally from the face of link 132 across the edge of link 129 in position for being struck thereby for swinging link 132 edgewise when the link 129 is swung to the right by virtue of travel of bracket 127 across cam 128. As shown in Fig. 10, the cam 128 is flared toward the right at its upper end, whereby bracket 127 is guided into contact with the cam when said bracket is lowered, the cam being positioned to the right of the bracket at the moment when engagement takes place.. A spring 129' normally maintains link 129 in engagement with pin 137. A lever 134 is pivoted at its outer end to a depending lug 135 fixed to cover plate 46, the lever being bifurcated at its inner end and having the arms 134' of the bifurcation extending on opposite sides of sleeve 62, each of said arms being provided with a radially, inwardly, extending pin 136 engaging in an annular groove 62' formed in the periphery of sleeve 62, whereby swinging of lever 134 is adapted to shift sleeve 62 axially and with it to shift disk 63 into position for causing pins 59 to extend through two of the notches 63''. To effect such swinging of lever 134 a connecting bar 133 is pivoted at one end to an intermediate portion of the lever 134 and at the other end to link 132, whereby swinging of link 132 through the actuation imparted by the shifting of bracket 127 along cam surface 128 will cause the clutch members to interlock for transmitting rotary movement from hub 60 to gear 57. In operation, this interlocking of the clutch members occurs before the respective link 80 reaches the limit of its slot 81, and upon reaching such limit the frame 84 is depressed which produces a thrust of rack bar 86 and a resulting rotary movement of gear 61 and hub 60. The clutch members being in clutch will transmit a corresponding movement to gear 57 and also to gear 56 which effects the proportional advance of dial 55. A spring 134'' engages lever 134 for effecting a retracting movement of sleeve 62 as soon as lever 134 is free for return movment, which occurs when bracket 127 moves downwardly below the lower end of cam surface 128. The resulting return movement of lever 134 thrusts link 129 edgewise across the free arm of bracket 127 so that when said arm rises it moves upwardly to the right of cam surface 128 instead of to the left of said cam surface, as heretofore, without further effect than the mere swinging of link 129 out of contact with pin 137, to which contact the link is returned by spring 129' as soon as the bracket is above the cam surface 128, whereby the cam surface is again positioned for being engaged and actuated at the next downward stroke of bracket 127. Should the operator depress a key only partially the parts will not return to normal position and the clutch will not release itself, since such partial movement of the key arm has not caused bracket 127 to pass beneath the lower end of cam surface 128 and therefore the beginning of the return movement of the key partially depressed causing a slight partial rotation of hub 60 moves disk 63 to the position indicated in Fig. 11 with the edge of the engaged notches 63'' in engagement with the under cut 59' of the respective pins 59, whereby the disk 63 is incapable of leaving gear 57 axially. It is obvious from the structure above described that with a full downward stroke of any of the key arms, the rack bar 86 will be given a thrust of a length proportioned to the distance which frame 84 is swung by the respective link 80, and that distance will vary according to the length of the respective slot 81, whereby from one-tenth to five-tenths of a revolution may be imparted to gear wheel 61 according to which key lever is depressed. The gear 56 is proportionally advanced, and if the movement is one-tenth, the dial 55 will be advanced one-twentieth, and the person whose fee has been registered by the depression of lever 67 on passing turnstile 31 turns the same for one quarter of a revolution, which as above explained imparts a reverse movement of one-tenth of a revolution to gear 53 which returns the dial 55 one-twentieth; that is, restores it to the zero point.

It will thus be apparent that as a person approaches and deposits his entrance fee, it is the duty of the operator in charge to depress the registering-mechanism-actuating key 72 in order to advance the dial 55 so as to position it for return movement as the party moves the turnstile through one-quarter of the revolution. To positively avoid omission by the operator to depress the key, mechanism is provided for locking the stile against rotation until the key is depressed and such mechanism is so designed that if key 72 is depressed when two persons have paid their fare, the turnstile will be locked after the passage of the first person and not again released until key 72 or one of the other registering keys is depressed. The specific embodiment of this locking mechanism as delineated in the accompanying drawings will now be set forth in detail.

As best seen in Figs. 3 to 5 a three-armed lever is pivotally connected by pin 140 to an inward extending lug carried by the inner face of the casing plate 77, one of the arms of the lever indicated at 141 being provided with a roller 142, engaging the adjacent edge of the dial ring 55. The engaged edge of the dial ring 55 is provided with an edgewise extending cam 143 adapted when the dial is moved to the zero position to engage and move the roller 142 to the position seen in Fig. 4 with the parts locked as hereinafter described. The zero position is the normal position of the dial, i. e., when none of the keys 72—76 has been depressed. Depressing of a key upon the payment of a fare will, of course, move the dial out of zero position so that the cam 143 of the dial is no longer in engagement with roller 142 of the lever. Another arm of the three armed lever carried by pivot 140 depends therefrom as at 144, and is formed with a squared or flat end adapted at times to engage a plunger hereinafter described for holding certain parts in released condition. A lateral arm 145 completes the lever and extends from pivot 140 to a point adjacent the inner face of the plate 77, a handle or knob 146 being fixed to the arm 145 and extending therefrom through a slot 146' in plate 77. A pin 147 similarly disposed to pin 140 pivotally carries a locking bell-crank lever 148 having a long arm upstanding from the pivot and disposed to at times lie beneath the actuating bar 126 of the clutch-carrying sleeve 60 (which is illustrated more particularly in Fig. 8) for locking the bar against descent and thereby locking the several keys 72 to 76 against actuation. A spring 148' engages said long arm of said locking lever 148 and draws the same normally out of the path of bar 126, thereby permitting free descent of bar 126 and actuation of the keys in the manner hereinbefore set forth. A short arm of lever 148 outstands substantially horizontally from the pivot 147 in position for being struck by a pin 149, carried by a plunger 150, as shown more particularly in Fig. 4. The plunger 150 extends downwardly through appropriate guides 150' carried by the housing 33, and as shown in Fig. 5 the lower end of the plunger rests on the free end of a lever 151, Fig. 17. Lever 151 is pivoted by pin 152 to a bracket 153 fixed to the rear wall of casing 33. A spring 158 normally maintains the lever 151 in an elevated position, the extent of possible upward movement of the lever being limited by collar 166' adjustably fixed to the shaft 39 as by an appropriate set screw. A lug 166 outstands from collar 166' and extends across lever 151 in position for engaging an upstanding lug 165, carried by the lever whereby the shaft 39 is effectively locked against rotation so long as the lever 151 remains in its elevated position as seen in full lines in Fig. 5. As shaft 39 is geared with the turnstile 31, locking of the shaft in this manner will lock the turnstile and prevent a person from entering the gate. Lever 151 is provided with a laterally extending lug 154 underhanging and adapted to be engaged by a lever 155 which is pivoted on pin 152 at one end and has its free end portion extending through casing 33 and carrying a tread 155'. The lever 155 extends on the opposite side of shaft 39 from lever 151, and the tread 155' is adapted to be depressed for depressing lever 151 through contact with lug 154, whereby the locking engagement between elements 166 and 165 is released, the parts assuming the position seen in dotted lines in Fig. 5. When in the position indicated by dotted lines in Fig. 5, shaft 39 is free to rotate. The descent of lever 151 allows the rod 150 to drop from the position seen in Fig. 4 to the dotted line position seen in Fig. 5 so that the lever 148 is left free to have its upstanding arm moved by spring 148' out of the path of bar 126, the rod 150 moving downwardly to a position with its upper end disposed beneath the squared end of lever arm 144. When rod 150 drops, its pin 149 is moved out of engagement with the lateral arm of bell crank lever 148, thereby allowing the spring 148' of said lever to move its vertical arm from beneath the bar 126. This releases bar 126 and permits the keys to be depressed. Hence the depression of the tread lever 155 sets free the keys 72—76. However, as the lever 151 is held normally elevated by a spring 158, the bar 150 will be immediately returned to its elevated locking position, unless held down by the depression of a key 72—76. When one of said keys is depressed, the cam 143 is moved out of engagement with the roller 142 of vertical arm 141, of the three-armed lever, the said arm moving over across the upper end of rod 150 as the free end of arm 141 moves inwardly toward the edge of dial ring 55. This movement of arm 141 is effected by a spring 145' engaging arm 145 exerting spring pressure tending to move the arm 145 upwardly, which of course effects the tendency of arm 141 to move inwardly and arm 144 to move outwardly. When the parts have assumed this position, the plunger 150, being held against upward movement by contact with the end of arm 144, will hold the lever 151 in its lower position with the lower lock, consisting of elements 165 and 166, released. The operator who has depressed lever 155 by engaging tread 155' with his foot may now remove his foot and the lever 155 will be raised by a spring 156 which is connected with the lever, but this movement will not effect the operation of the shaft 39, since lever 151 is held depressed by the engagement of rod 150 with the squared end 144 of the three-armed lever. It is to be noted that this position of release is maintained only when a key lever has been depressed and the dial 55 thus advanced until cam 143 is no longer in engagement with roller 142, and the parts are thus positioned for allowing the stile to be rotated. A leather or other cushion bumper 157 is provided for preventing undue shock in case of sudden return of lever 155. As an emergency measure, it may become desirable to lock the turnstile while the parts are in the released condition mentioned, and to do so the operator merely depresses lever arm 145 by pressing down on knob 146, whereupon the free end of lever arm 144 will be moved inwardly across the upper end of rod 150, and, releasing the rod, permits lever 151 to rise to the locking position. To restore the released condition of the parts, it is only necessary to release knob 146 and depress lever 155.

The shaft 39 is locked against rotation when the foot pedal has been depressed to free the keys and before a key has been actuated in the following manner: A bracket 120, seen best in Figs. 4 and 5, is bolted to the front and side walls of the casing 33 and is provided with a sleeve 120' surrounding and snugly fitting the shaft 39 so as to form a bearing for the upper end portion thereof. A lock lever is pivoted to bracket 120, as at 122, and has a short arm 124 extending beneath and in position to be engaged by arm 145, while the long end of the lock lever is formed with a hook 121 disposed at times to engage a locking lug 123 extending radially from the hub of gear 40 or otherwise appropriately fixed to the shaft 39. A spring 138 engages the long arm of the locking lever and exerts pressure tending to pull the hook 121 downwardly out of engagement with lug 123, so that when the lever is released the hook will remain normally out of engagement with the lug; but when arm 145 is depressed and presses the end 124 of the lever downwardly the locking action is effected, and it is, of course, obvious that the depression of arm 145 may be accomplished either by the operator pressing the knob 146 downwardly or by the arm 141 being thrust laterally through the engagement of cam 143 with roller 142. Thus the operator is provided with means for locking the mechanism, after the dial 55 has been advanced to a lock releasing position, and while the lever 151 is depressed to the lock releasing position, and the lock 121 also assures against release of the turnstile by the operator without his having advanced the dial 55, which advance can be accomplished by him only by actuation of the key lever. An inspection opening 55' formed in the cover plate 46 immediately above the dial 55 enables ready inspection thereof for facilitating ascertaining the disposition of the dial. The natural sequence of operation is first to depress lever 155, disengaging the lower lock, and then to depress a key 72—76, according to the number of entrance fees paid, whereupon the upper lock or auxiliary lock will be released, and the turnstile is free to be revolved to the extent represented by the number of persons indicated by the particular key depressed.

An eye 159, Fig. 18, upstands from and is preferably formed integral with the lever 155 and is located adjacent to the inner face of the wall of casing 33 in position for being engaged by the locking hook 160 of a bell crank or elbow lever type pivoted at 162 to the wall of casing 33. Said elbow lever has its depending arm 161, which carries the hook 160 engaged by a spring 162', tensioned to retain the hook out of engagement with eye 155'. The horizontal arm 163 of the lever extends to a point below the bolt 164 of a key lock 164' so that in operation when said bolt is thrown the lever will be swung on its pivot against the tension of spring 162' to the position indicated in dotted lines in Fig. 18, whereupon the parts will be locked effectively against any action, and cannot be released until the bolt 164 has been retracted.

Meshing with gear 57 is a gear 235 best seen in Figs. 6 and 26 which is mounted on the spindle of a counter 236 of a well known pattern. A depending extension 237 carried by cover plate 46 sustains the counter 236, and the said cover plate is formed with an aperture immediately above the counter which aperture is normally closed by a plate 238 to which is fixed a depending angular plate 239, one portion of the plate 239 being formed with an aperture for receiving the bolt 243 of a key lock 244. The apertured portion of plate 239 consists of an arm 242 which is disposed at one side of the inspection aperture closed by plate 238, and at the other side of said inspection aperture the plate 239 is provided with angular slotted ears 240, through the slots of which extends a rod 241 carried by depending lugs sustained by plate 46. The said ears, when the lock bolt 242 is withdrawn, permit the plate 236 to be first elevated until the arm 242 is in a position to leave the inspection aperture, and then the plate may be swung pivotally and moved to the position indicated in dotted lines in Fig. 26. Thus the counter 236 may be readily inspected by an authorized person supplied with a key for lock 244.

On the hub of gear 41, Figs. 4, 21 and 22, is formed an eccentric 170 engaging a contact making lever 172 pivoted to the side wall or plate 45 of the housing as at 171 and engaged by a spring 173 which maintains the lever in contact with the eccentric. A three point ratchet wheel 181 is rotatably mounted on a pin or stub shaft 182 fixed to plate 45, the arms or points of the ratchet extending into the path of movement of lever 172 from time to time in the course of revolution of the ratchet. To insure that one of the arms 184 of ratchet 181 is moved to a position in the path of the contact plate 175 of lever 172 after each operation of the lever, the ratchet 181 is provided with three pins 183 spaced equi-distant and located to be engaged by the cam surfaces of a cam lever 185 pivoted at 186 to plate 45 and engaged by spring 187 for causing the cam surfaces to engage appropriate pins 183 and move the same to position after actuation of the ratchet by lever 172. An insulating block 176 is carried by lever 172 and a contact arm 177 is carried by the block 176. On the arm is mounted a brush or spring wiper 178 adapted to insure effective electrical contact with ratchet 181. A conductor 179 is connected with the brush 178 and a coöperating conductor 180 is grounded on plate 45, the two conductors extending through a conduit 188 to a distant point for delivering impulses of current adapted to actuate registering or other signal mechanism as hereinafter described. As the eccentric 170 is revolved the lever 172 is raised from the position seen in Fig. 21 to the position seen in Fig. 22, during which movement the contact portion 175 is caused to strike one of the arms 184 and to rotate the ratchet wheel to the position seen in Fig. 22 with the particular pin 183 which at that time engages lever 185 on the outer side of the point or projection of the lever, so that when the return movement occurs and the ratchet is released, the downward movement of lever 185 under the pressure of spring 187 will cause the engaged pin 183 to be cammed over to the position indicated in Fig. 21, so as to position the ratchet wheel for the next operation. When the parts have assumed the position indicated in Fig. 22, the contact brush 178 has closed contact between conductors 180 and 179, and thereupon current is delivered to the distant point and the contact is maintained until the eccentric 170 moves to a point permitting spring 173 to swing the longer arm of lever 172 downward until contact is broken between brush 178 and the ratchet. Thereupon the cam surface of lever 185 acts to partially rotate the ratchet to prepare it for the next engagement. As eccentric 170 makes one revolution with each quarter turn of the turnstile, an impulse of current is delivered to the distant point each time a person is admitted past the turnstile.

The conductors 179 and 180 have a suitable source of current, such as a battery, not illustrated, in circuit and extend to terminals 189 and 190, Figs. 23, 24 and 25, which are connected with a pair of magnet coils 191, 192. The said coils are supported on a base 193 and inclosed by a cover 194 which also incloses a counter 197 of a type commonly in use. Extensions 195 and 196 upstand from base 193 for supporting counter 197, and to the shaft of the counter is rigidly fixed an escapement wheel 198. An escapement lever 200 is pivoted by a pin 199 to the extension 196 formed on base 193, the lever 200 being provided with arcuate arms adjacent to the wheel 198, and the arms being provided with pins 201 disposed to alternately engage the teeth of wheel 198 for advancing the wheel a distance equal to one-half of a tooth each time the wheel is engaged by a pin, so that with each reciprocation of lever 200 the escapement wheel 198 is advanced one tooth, that is the distance required for advancing the counter one number. A spring 203 is connected with pin 204 at one end and with lever 200 at the other for normally maintaining the lever spaced from the magnet terminals. An extension 205 is fixed to lever 200 and carries an armature 206 disposed in the field of the terminals 207 of the magnets so that when an impulse of current energizes said magnets the lever 200 will first be drawn in one direction by the action of the magnetism on the armature, and then the lever, when the circuit is broken, is swung in the opposite direction by the action of spring 203. The cover 194 is preferably locked or sealed in place and is formed with an inspection opening 208 for enabling visual examination of the counter.

Mounted on the cover plate 46 is a preferably transparent receptacle consisting of a base 210 from which upstands corner posts 211 connected at their top by a framing 212, the several posts and framing sustaining glass or other appropriate plates for forming the receptacle, as indicated at 215. Within the receptacle are arranged the inclined or baffle plates 216 and 217, while on top of the receptacle is arranged the guard or inclined plate 214 extending along the opening 213 through which coin is introduced into the receptacle. The cover plate 46 is formed with an aperture 219 surrounded by the base of the receptacle and closed by a door 219 hinged at 220 to plate 46 and retained normally closed by spring 221.

A lever 223 is pivoted to a lug 222 extending inwardly from the wall of casing 33. An arm 224 extends outwardly from the upper portion of lever 223 and its outer end portion is formed into an operating handle 225. Pivoted to the upper end portion of lever 223 within the casing 33 is a link 226, which has its opposite end pivoted to a crank arm 227 fixed to a rock shaft 228, the rock shaft being journaled in lugs depending from the cover plate 46. A crank arm 229 is also fixed to the shaft 228 and is pivotally connected to a link 230, which link is in turn pivotally connected to a bracket or depending portion extending from the door 219. Thus when the handle 225 is drawn outwardly by the operator to the position indicated in dotted lines in Fig. 19, the chain of connections between lever 223 and door 219 will effect an opening movement of the door so that the same is moved to the position indicated in dotted lines in Fig. 19 whereupon any coin previously deposited on the door will be discharged down into the casing 33 and will be guided by the deflecting plates 231 and 232 into the coin receptacle or other point of deposit 233. It is believed that the detail operation of the several parts will be understood from the foregoing, and the general operation may be briefly described as follows:

A person approaching the turnstile 31 deposits his entrance fee through opening 213 and then proceeds past the turnstile revolving the turnstile one-quarter of a revolution in the course of passing. The operator or guard in charge of the turnstile, as the person approaches and deposits his entrance fee, depresses lever 155 which releases the lower locking mechanism of the turnstile and also releases the key lock 148, and he then depresses key 72 which advances the dial 55 until the cam 143 is out of engagement with roller 142 whereby the upper lock for the turnstile is released, and the mechanism is in condition for the passage of the person whose fee was deposited. As the person passes the turnstile the one-quarter revolution of the turnstile imparts a complete revolution to wheel 43 and the dial 55 is returned to its initial position with the cam 143 pressing roller 142 outwardly and thus depressing the short arm 124 of the upper lock and causing the lock action of the lock hook 121. The counting mechanism 236 will have been actuated by the depression of the key 72, and the counting mechanism 197 will have been actuated by an electrical impulse distributed through contact of brush 178 with ratchet 181 effected by the action of the eccentric 170 during revolution of shaft 42. The mechanism is then in condition for the next operation. Obviously, the operator may, if he prefers, retain his foot on tread 151′ while persons are being rapidly admitted past the turnstile so as to avoid the delay incident to locking and unlocking the stile, but the upper locking mechanism will act to lock and release according to conditions of the dial 55 which are controlled directly by the key levers. If more than one entrance fee is paid at a time the operator will press a key corresponding to the number of fees paid and thus advance the dial 55 a distance sufficient to allow the successive admission passed the turnstile up to the number indicated by the depressed key. If more than five fees are paid at once, say eight fees, the operator will depress key 76 and release the same and then depress key 74 which will register eight on the counting mechanism 236 and will proportionally advance the dial 55 so that eight persons may pass the turnstile before the automatic lock or upper lock acts to stop rotation of the turnstile. If fifteen entrance fees are paid at one time the operator will make three successive actuations of key 76 and the automatic or upper locking mechanism will thus act to set and release the turnstile for the admission of fifteen persons. If more than twenty fees are paid at once, the operator will be obliged to await the admission of some of the persons before registering the balance, but at all events under no circumstances will the turnstile be released for permitting the admission of a person until a proper registration has been effected by the depression of a key lever and a corresponding actuation of the counting machine 236.

What I claim is:—

1. In turnstile mechanism, the combination, with a turnstile, of indicator mechanism actuated thereby, double locking means for locking the turnstile against rotation when the indicator mechanism is not set for actuation by the turnstile, and means for retaining both locking means released when the indicator mechanism is set for actuation by the turnstile.

2. In turnstile mechanism, the combination, with a turnstile, of indicator mechanism adapted to be actuated thereby, a register, register actuating means for setting the indicator mechanism preparatory to actuation by the turnstile, and means for locking the turnstile releasable upon setting of the indicator mechanism.

3. In turnstile mechanism, the combination, with a turnstile, of indicator mechanism adapted to be actuated thereby, a register, register actuating means for setting the indicator mechanism preparatory to actuation by the turnstile, means for locking the turnstile releasable upon setting of the indicator mechanism, and releasable means for locking both the turnstile and the register actuating means against movement.

4. In turnstile mechanism, the combination, with a turnstile, of indicator mechanism adapted to be actuated thereby, a register, register actuating means for setting the indicator mechanism preparatory to actuation by the turnstile, means for locking the turnstile releasable upon setting of the indicator mechanism, releasable means for locking both the turnstile and the register actuating means against movement, and means for holding the two locks in their released position during an operative movement of the turnstile.

5. In turnstile mechanism, the combination, with a turnstile, of indicator mechanism adapted to be actuated thereby, a register, register actuating means for setting the indicator mechanism preparatory to actuation by the turnstile, means for locking the turnstile releasable upon setting of the indicator mechanism, a releasable lock for locking the turnstile against movement, and a lock for the register actuating means adapted to be released upon release of the releasable lock.

6. In turnstile mechanism, the combination, with a turnstile, of indicator mechanism adapted to be actuated thereby, a register, register actuating means for setting the indicator mechanism preparatory to actuation by the turnstile, means for locking the turnstile releasable upon setting of the indicator mechanism, a releasable lock for locking the turnstile against movement, a lock for the registering mechanism, and means adapted to be actuated upon actuation of the releasable lock for releasing the register actuating mechanism and for retaining the releasable lock and the lock for the registering mechanism released during actuation of the turnstile.

7. In turnstile mechanism, the combination, with a turnstile, of indicator mechanism adapted to be actuated thereby, a register, register actuating means for setting the indicator mechanism preparatory to actuation by the turnstile, means for locking the register actuating means against operation, means for locking the turnstile against operation, and means actuated by the turnstile locking means for controlling the locking means for the register actuating means.

8. In turnstile mechanism, the combination, with a turnstile, of indicator mechanism adapted to be actuated thereby, a register, register actuating means for setting the indicator mechanism preparatory to actuation by the turnstile, means for locking the register actuating means against operation, means for locking the turnstile against operation, and a plunger actuated by the turnstile locking means for locking the locking means of the register actuating means when the turnstile is locked.

9. In turnstile mechanism, the combination, with a turnstile, of indicator mechanism adapted to be actuated thereby, a register, register actuating means for setting the indicator mechanism preparatory to actuation by the turnstile, means for locking the register actuating means against operation, means for locking the turnstile against operation, means actuated by the turnstile locking means for controlling the locking means for the register actuating means, and means controlled by the actuation of the register actuating means for engaging and retaining the plunger and turnstile locking means in released condition upon actuation of the register actuating means and until the turnstile has been thereafter operated.

10. In turnstile mechanism, the combination, with a turnstile, of indicator mechanism adapted to be actuated thereby, a register, register actuating means for setting the indicator mechanism preparatory to actuation by the turnstile, means for locking the register actuating means against operation, means for locking the turnstile against operation adapted upon release to release the locking means for the indicator mechanism, and means controlled by the register actuating means for retaining the turnstile locking means in released condition during operation of the turnstile and proportionally to the extent of actuation of the indicator means.

11. In turnstile mechanism, the combination, with a turnstile, of indicator mechanism adapted to be actuated thereby, a register, register actuating means for setting the indicator mechanism preparatory to actuation by the turnstile, means for locking the register actuating means against operation, means for locking the turnstile against operation adapted upon release to release the locking means for the register actuating mechanism, means controlled by the register actuating means for retaining the turnstile locking means in released condition during operation of the turnstile and proportionally to the extent of actuation of the register actuating means, and means for restoring the locked condition of both said locking means upon completion of actuation of the turnstile to an extent agreeing with that indicated by the extent of actuation of the register actuating means.

12. In turnstile mechanism, the combination, with a turnstile, of indicator mechanism adapted to be actuated thereby, a register, register actuating means for setting the indicator mechanism preparatory to actuation by the turnstile, means for locking the register actuating means against operation, means for locking the turnstile against operation adapted upon release to release the locking means for the register actuating mechanism, means controlled by the register actuating means for retaining the turnstile locking means in released condition during operation of the turnstile and proportionally to the extent of actuation of the register actuating means, a second lock for the turnstile releasable by actuation of the register actuating mechanism, and means for restoring the locked condition of all three said locking means upon completion of actuation of the turnstile to an extent agreeing with that indicated by the extent of actuation of the register actuating means.

13. In turnstile mechanism, the combination, with a turnstile, of means for locking the turnstile against movement, a register, register actuating means, locking means therefor, a lever disposed to be moved into position for retaining the locking means for the register actuating means in locking relation therewith, and means actuated by the turnstile locking means when moving to a locking position for moving said lever to position retaining the register actuating means locked.

14. In turnstile mechanism, the combination, with a turnstile, of means for locking the turnstile against movement, a register, register actuating means, locking means therefor, a lever disposed to be moved into position for retaining the locking means for the register actuating means in locking relation therewith, and a plunger engaging the turnstile lock and extending in position and adapted to be actuated when the turnstile lock is moved to locking position for engaging and shifting the lever to position retaining the register actuating means locked.

15. In turnstile mechanism, the combination, with a turnstile, of means for locking the turnstile against movement, a register, register actuating means, a plunger adapted to be shifted by the turnstile locking means in moving to a locking position, and a lever disposed across the path of the plunger and adapted to be struck thereby and shifted into position locking the register actuating means against movement.

16. In turnstile mechanism, the combination, with a turnstile, of means for locking the turnstile against movement, a register, register actuating means, a plunger adapted to be shifted by the turnstile locking means in moving to a locking position, a lever disposed across the path of the plunger and adapted to be struck thereby and shifted into position locking the register actuating means against movement, the plunger being adapted to be retracted upon release of the turnstile lock, and means controlled by the register actuating means for locking the plunger in its retracted position during actuation of the turnstile.

17. In turnstile mechanism, the combination, with a turnstile, of means for locking the turnstile against movement, a register, register actuating means, a plunger adapted to be shifted by the turnstile locking means in moving to a locking position, a lever disposed across the path of the plunger and adapted to be struck thereby and shifted into position locking the register actuating means against movement, the plunger being adapted to be retracted upon release of the turnstile, and means controlled by the register actuating means for locking the plunger in its retracted position during actuation of the turnstile proportionally to actuation of the register actuating means and for releasing the plunger and effecting locking action of the second turnstile lock at the conclusion of such proportional movement of the turnstile.

18. In turnstile mechanism, the combination, with a turnstile, of means for locking the turnstile against movement, a register, register actuating means, and means connected to be moved from an initial position by actuation of the register actuating means and to be returned to initial position by proportional actuation of the turnstile for actuating and controlling said locking means for releasing the same when the register actuating means is operated and for rendering the lock effective to lock the turnstile when the lock actuating and controlling means has been restored to the initial position by actuation of the turnstile.

19. In turnstile mechanism, the combination, with a turnstile, of means for locking the turnstile against movement, a lever for controlling the locking means, means for shifting the lever for effecting such control, a register, register actuating means connected to move the lever actuating means from an initial position for effecting lock releasing movement of the lever, and means actuated by the turnstile for returning the lever actuating means to the initial position for shifting the lever for effecting locking action of the locking means.

20. In turnstile mechanism, the combination, with a turnstile, of means for locking the turnstile against movement, a pivotally mounted lever adapted to engage the turnstile locking means for controlling operation thereof, a register, register actuating mechanism having engagement with said lever adapted to effect lock releasing shift of the lever upon actuation of the register actuating mechanism, and turnstile actuated means for effecting a reverse shift of the lever.

21. In turnstile mechanism, the combination, with a turnstile, of locking mechanism for the turnstile, a lever having an arm adapted to engage and control actuations of the locking mechanism and an operating arm, means for shifting the operating arm, register actuating mechanism disposed to operate said shifting means for effecting a lock releasing movement of the lever, and means actuated by the turnstile for operating the shifting means for moving the operating arm for effecting locking action of said locking means.

22. In turnstile mechanism, the combination, with a turnstile, of locking means for the turnstile, a three-armed lever pivoted in position for one of the arms to control said locking means, a second locking means spaced from the first mentioned locking means, means actuated by an operator for releasing the second locking means, means engaged by an arm of the lever other than the lock controlling arm for retaining the second mentioned locking means in released position when the lock controlling arm is in position for effecting release of the first mentioned locking means, and means for shifting the third arm of the lever to and from the lock releasing position of the lock controlling arm.

23. In turnstile mechanism, the combination, with a turnstile, of locking means for the turnstile, a three-armed lever pivoted in position for one of the arms to control said locking means, a second locking means spaced from the first mentioned locking means, means actuated by an operator for releasing the second locking means, means engaged by an arm of the lever other than the lock controlling arm for retaining the second mentioned locking means in released position when the lock controlling arm is in position for effecting release of the first mentioned locking means, means for shifting the third arm of the lever to and from the lock releasing position of the lock controlling arm, register actuating means, and means actuated thereby for shifting the last mentioned arm of the lever to the lock releasing position.

24. In turnstile mechanism, the combination, with a turnstile, of locking means for the turnstile, a three-armed lever pivoted in position for one of the arms to control said locking means, a second locking means spaced from the first mentioned locking means, means actuated by an operator for releasing the second locking means, means engaged by an arm of the lever other than the lock controlling arm for retaining the second mentioned locking means in released position when the lock controlling arm is in position for effecting release of the first mentioned locking means, means for shifting the third arm of the lever to and from the lock releasing position of the lock controlling arm, register actuating means, means actuated thereby for shifting the last mentioned arm of the lever to the lock releasing position, and means actuated by the turnstile for operating the lever shifting means for moving the lever to the locking position.

25. In turnstile mechanism, the combination, with a turnstile, of a cam, a register for registering successive operations of the turnstile, register actuating means adapted to shift the cam in one direction, means actuated by the turnstile for shifting the cam in the opposite direction, a lock for the turnstile, and means actuated by the cam for releasing the lock when the cam is shifted by actuation of the register actuating means and for effecting locking action of the lock when the cam is returned by movement of the turnstile.

26. In turnstile mechanism, the combination, with a turnstile, a register for registering successive operations of the turnstile, register actuating means, a cam adapted to be shifted thereby in one direction, means actuated by the turnstile for shifting the cam in the other direction, a lock for the turnstile, and a lever for controlling locking action of said lock, said lever being adapted to be shifted by engagement of the cam.

27. In turnstile mechanism, the combination, with a turnstile, a register for registering successive operations of the turnstile, register actuating means, a dial connected to be actuated thereby for being moved from an initial position to an advanced position on actuation of the register actuating means, means actuated by the turnstile for moving the dial in a reverse direction, and means actuated by the dial for controlling movements of the turnstile.

28. In turnstile mechanism, the combination, with a turnstile, of indicating means, means actuated by the turnstile for shifting the indicating means in one direction, manually actuated means for shifting the indicating means in the opposite direction, means for locking the turnstile, and means controlled by the indicating means for controlling operation of the turnstile locking means.

29. In turnstile mechanism, the combination, with a turnstile, of axially alined facing miter gears, pinions meshing with both said gears, a ring carried by the pinions, register actuating means adapted to shift one of the gears in one direction, means actuated by the turnstile for shifting the other gear proportionally in the other direction, and locking means releasable upon movement of said ring by said register actuating means.

30. In turnstile mechanism, the combination, with a turnstile, of axially alined facing miter gears, pinions meshing with both said gears, a ring carried by the pinions, register actuating means adapted to shift one of the gears in one direction, means actuated by the turnstile for shifting the other gear proportionally in the other direction, a lock for the turnstile, and means controlled by the ring for controlling the operation of the lock.

31. In turnstile mechanism, the combination, with a turnstile, of axially alined facing miter gears, pinions meshing with both said gears, a ring carried by the pinions, register actuating means adapted to shift one of the gears in one direction, means actuated by the turnstile for shifting the other gear proportionally in the other direction, a cam carried by the ring, a lever actuated by the cam, and a lock for the turnstile controlled by said lever.

32. In turnstile mechanism, the combination, with a turnstile, of an indicator, means for shifting the indicator in one direction, means actuated by the turnstile for shifting the indicator in the opposite direction, and means controlled by the indicator for locking the turnstile when the indicator is returned to its starting position.

33. In turnstile mechanism, the combination, with a turnstile, of an indicator, actuating means for advancing the indicator for a step or a series of steps, a gear for reversing the movement of the indicator, and means actuated by the turnstile for moving said gear with a step by step movement.

34. In turnstile mechanism, the combination, with a turnstile, of an indicator, actuating means for advancing the indicator for a step or a series of steps, a gear for reversing the movement of the indicator, means actuated by the turnstile for moving said gear with a step by step movement, and means actuated by the indicating means for controlling rotation of the turnstile.

35. In turnstile mechanism, the combination, with a turnstile, of a shaft actuated by the turnstile and having a radial projection, a lever pivoted to swing axially of the shaft and having a hook portion adapted to be moved into the path of movement of the projection on the shaft, an indicator actuated by the turnstile, and means actuated by the indicator for swinging said lever to the locking position.

36. In turnstile mechanism, the combination, with a turnstile, of a shaft actuated by the turnstile and having a radial projection, a lever pivoted to swing axially of the shaft and having a hook portion adapted to be moved into the path of movement of the projection on the shaft, an indicator actuated by the turnstile, means actuated by the indicator for swinging said lever to the locking position when the turnstile has been given a predetermined amount of movement and for releasing the lever when the indicator has been conversely moved, and means for moving the lever out of the locking position when released.

37. In turnstile mechanism, the combination, with a turnstile, of means for locking the turnstile against movement, a register, register actuating means for releasing the turnstile, a pivotally mounted frame having a portion extending in the path of and adapted to be engaged by the register actuating means during operation, a locking lever having an arm adapted to be disposed in the path of movement of the frame for preventing movement thereof, and manually controlled means for controlling movement of the lever to and from the position in the path of the frame.

38. In turnstile mechanism, the combination of a register actuating gear, an operating key therefor, a clutch for transmitting movement from the key to the gear, and means for locking the clutch against release upon partial actuation of the key.

39. In turnstile mechanism, the combination of a register actuating gear, a clutch member carried thereby, an axially movable coöperating clutch member adapted to be shifted to and from a position engaging the gear carried clutch member, key actuating means for rotating the shiftable clutch member, means for shifting the shiftable clutch member into clutching engagement with the gear carried clutch member, and key control means for releasably locking the clutch members against a return shift of the shiftable clutch member.

40. In turnstile mechanism, the combination of a register actuating gear, a clutch member carried thereby, an axially shiftable coöperating clutch member, a gear for actuating the shiftable clutch member, a key for rotating the last named gear, means actuated by the key for moving the shiftable clutch member into clutching engagement with the gear carried clutch member, and means controlled by the key for locking the clutch members against axial disengagement upon partial actuation of the key.

41. In turnstile mechanism, the combination of a register actuating gear, a key for actuating the gear, clutch members for transmitting movement from the key to the actuating gear, one of the clutch members being axially shiftable and rotatably mounted and adapted to be rotated in one direction during actuating movement of the key and in the opposite direction during return movement thereof, means for shifting the axially movable clutch member into clutching relation with the other clutch member, and means for effecting a return axial shift of the shiftable clutch member toward the conclusion of the actuating stroke of the key and prior to its return movement, the clutch members being formed with interlocking means adapted to interlock and prevent axial shifting of the shiftable clutch member upon reverse rotation thereof while in clutch.

42. In turnstile mechanism, the combination of a register actuating gear, a rotary sleeve, a clutch member carried by the gear, an axially shiftable clutch member keyed to the sleeve and adapted to coöperate with the first mentioned clutch member, a key for actuating the gear, means for rotating the sleeve in one direction during an operative stroke of the key and in the reverse direction on the return stroke thereof, key actuated means for shifting the axially movable clutch member into clutching engagement with the other clutch member, the clutch members being provided with interlocking means for retaining the shiftable clutch member against shifting upon reverse rotation of the sleeve during a clutch condition of the clutch members, and means for shifting the shiftable clutch member out of clutching relation with the other clutch member upon completion of a given actuation of the register actuating gear and just prior to completion of rotation of the sleeve on the actuating stroke of the key.

43. In turnstile mechanism, the combination of a register actuating gear, a clutch member shiftable toward and away from said gear, means for rotating said clutch in an advancing direction and in a reverse direction, the clutch member being formed with an aperture, a pin extending from the gear in position for entering the aperture, said pin being formed with a lateral notch adapted to engage and lock the clutch member against release movement upon reverse rotary movement of the clutch member while in engagement with the pin, and means for shifting the clutch member into and out of engagement with said pin during advance rotation of the clutch member.

44. In turnstile mechanism, spaced gear wheels, a turnstile, means actuated by the turnstile for rotating one of the gears in one direction, a register, register actuating means for rotating the other gear in the opposite direction, a releasable lock for the turnstile, a pinion meshing with both gear wheels, and means actuated by the pinion for controlling the turnstile lock.

45. The combination of a register, a register actuating gear, a clutch for actuating the gear, means for revolving the clutch, a key for actuating the clutch revolving means adapted to rotate the clutch in an advance direction during the working stroke of the key and in a reverse direction during the return stroke of the key, means for moving the clutch to clutching position during the initial portion of the working stroke of the key and for returning the clutch to disengaged position during the terminal portion of the working stroke of the key, and means for locking the clutch against disengagement when rotated in a reverse direction prior to disengagement.

46. The combination of a register, a register actuating gear, a clutch for actuating the gear, means for revolving the clutch, a key for actuating the clutch revolving means adapted to rotate the clutch in an advance direction during the working stroke of the key and in a reverse direction during the return stroke of the key, means for moving the clutch to clutching position during the initial portion of the working stroke of the key and for returning the clutch to disengaged position during the terminal portion of the working stroke of the key, means for locking the clutch against disengagement when rotated in a reverse direction prior to disengagement, and means for retaining the register actuating gear against reverse rotation.

47. The combination of a register, a register actuating gear, a sleeve rotatable relative to the gear, a pinion carried by the sleeve, a reciprocating rack meshing with the pinion, a key disposed to actuate the rack, a clutch member keyed to the sleeve, key actuated means for shifting the sleeve axially toward and away from the register actuating gear, and a coöperating clutch member connected with the register actuating gear and adapted to be engaged by the first clutch member.

48. The combination of a register actuating gear, a clutch member shiftable relative thereto, a key connected to rotate the clutch member, a coöperating clutch member connected with the gear, a lever for shifting the first clutch member into clutch with the second clutch member, a key, a frame disposed to be engaged and actuated by the key, and a cam carried by the frame and adapted to swing the lever for shifting the first clutch member into engagement with the second.

49. In combination, a register actuating gear, pins thereon, a pair of escapement control levers each having a pin-engaging end portion, means for retaining one lever in engagement with a pin and the other spaced therefrom, turnstile controlling mechanism, a key for actuating said controlling mechanism and for rotating the gear, and means actuated by the key for shifting the pin-engaging lever out of such engagement and the other lever into engagement with one of the pins, the movements of the levers being timed to permit the required rotation of the gear between engagements of the levers.

50. In combination, a registering actuating gear, pins thereon, a pair of escapement control levers each having a pin engaging portion, means for normally retaining one of the levers with its pin engaging portion in engagement with one of the pins, means for normally retaining the other lever with its pin engaging portions spaced from the pin, an operating key for actuating the gear, means in the path of travel of the key and connected with the second lever for swinging the same into pin engaging position, and means actuated by the said lever swinging means for swinging the first lever out of the pin engaging position.

51. In combination, a register actuating gear, pins thereon, a pair of escapement control levers each having a pin engaging portion, a spring for each of the levers engaging the same and tensioned to retain one of the levers normally in pin engaging position and to retain the other lever normally out of pin engaging position, a key for actuating the gear, a pivoted frame extending in the path of the key for being actuated thereby, a cam connected to the lever normally engaging a pin, the cam being disposed in the path of a portion of the frame for effecting swinging of the lever out of engagement with the pin when the frame is swung, and means connected with the other lever and extending into position for being engaged and actuated by the frame for moving the last named lever into pin engaging position.

52. In combination, a register actuating gear, pins thereon, a pair of escapement control levers each having a pin engaging portion, a spring for each of the levers engaging the same and tensioned to retain one of the levers normally in pin engaging position and to retain the other lever normally out of pin engaging position, a key for actuating the gear, a pivoted frame extending in the path of the key for being actuated thereby, a cam connected to the lever normally engaging a pin, the cam being disposed in the path of a portion of the frame for effecting swinging of the lever out of engagement with the pin when the frame is swung, means connected with the other lever and extending into position for being engaged and actuated by the frame for moving the last named lever into pin engaging position, means for locking the last named lever in pin engaging position, and means carried by the first named lever for releasing the locking means.

53. In combination, a register actuating gear, pins thereon, a pair of escapement control levers each having a pin engaging portion, a spring for each of the levers engaging the same and tensioned to retain one of the levers normally in pin engaging position and to retain the other lever normally out of pin engaging position, a key for actuating the gear, a pivoted frame extending in the path of the key for being actuated thereby, a cam connected to the lever normally engaging a pin, the cam being disposed in the path of a portion of the frame for effecting swinging of the lever out of engagement with the pin when the frame is swung, means connected with the other lever and extending into position for being engaged and actuated by the frame for moving the last named lever into pin engaging position, a pivotally mounted hook adapted to be moved in position for underhanging a portion of the last named lever for locking the lever in the pin engaging position, a spring pressing the hook toward the locking position, and a cam carried by the other lever in position for engaging the hook and shifting the same to a releasing position upon return movement of the cam carrying lever.

54. In combination, a register actuating gear, pins extending therefrom, escapement levers disposed to engage the pins, a spring for retaining one of the levers normally in engagement with the pins, a spring for retaining the other lever out of engagement with the pins, an actuating key for operating the gear, a pivoted frame extending into the path of the key for being actuated thereby, a longitudinally slotted link pivoted to the lever normally out of engagement with the pins, a pin extending through the slot of the link and engaging the frame for causing the lever carrying the link to be moved to pin engaging position after a predetermined movement of the pivoted frame incident to the travel of the pin in the slot, and means disposed in the path of the frame for swinging the lever normally engaging the pin out of engagement therewith during travel of the frame carried pin in the slot of the link.

55. In a turnstile mechanism, the combination, with a turnstile, of an indicator-mechanism-controlling shaft actuated by the turnstile, a locking lever having a portion adapted to be swung to and from a position in the path of a portion of the shaft for locking the shaft against movement, and a lever pivoted to swing in planes substantially parallel to the planes of movement of the first lever and disposed to engage the first lever for moving the same to a position out of locking engagement with the shaft.

56. In a turnstile mechanism, the combination, with a turnstile, of an indicator-mechanism-controlling shaft actuated by the turnstile, a locking lever having a portion adapted to be swung to and from a position in the path of a portion of the shaft for locking the shaft against movement, a lateral lug on the lever, and a lever pivoted to swing in planes substantially parallel to the planes of movement of the first lever, the lug extending into the path of the second lever in position for being struck and actuated thereby.

57. In turnstile mechanism, the combination, with a turnstile, of an indicator-mechanism-controlling shaft, a casing inclosing the shaft, a lever pivoted within the casing and terminating therein and disposed to swing to and from a position engaging and locking the shaft against movement, and a pivotally mounted lever extending through the casing and disposed to engage and actuate the first lever for moving the same out of engagement with the shaft.

58. In turnstile mechanism, the combination, with a turnstile, of a register geared to be moved by the turnstile, register actuating means geared to move the register, and means for retaining the recorder actuating means against movement during actuation of the register by the turnstile gear.

59. A turnstile mechanism comprising a turnstile, means for normally locking the same against operation, an indicator mechanism, and means responsive to the actuation of said indicator mechanism for releasing the turnstile for operation to an extent determined by the extent of operation of the indicator mechanism.

60. A turnstile mechanism comprising a turnstile, means for normally locking the same against operation, a manually operable indicator mechanism adapted when operated to release said locking means and permit operation of the turnstile to an extent determined by the extent of operation of the indicator mechanism, and means for restoring said locking means to locking relation with respect to the turnstile, when the latter has been operated to an extent previously determined by the indicator mechanism.

T. IRVING POTTER.

Witnesses:
E. V. REARDON,
M. C. GEIL.

Copies of this patent may be obtained for five cents each, by addressing the "Commissioner of Patents, Washington, D. C."